United States Patent
Cotton et al.

(10) Patent No.: US 6,231,318 B1
(45) Date of Patent: May 15, 2001

(54) IN-TAKE FUEL PUMP RESERVOIR

(75) Inventors: Kenneth J. Cotton, Caro; Bryan J. Gettel, Pigeon; Ronald B. Kuenzli, Deford; Peter P. Kuperus, Cass City; G. Clarke Oberheide, Troy; Ronald H. Roche, Cass City; Joseph M. Ross, Millington; Kevin L Williams, Columbiaville, all of MI (US)

(73) Assignee: Walbro Corporation, Cass City, MI (US)

(*) Notice: Subject to any disclaimer, the term of this patent is extended or adjusted under 35 U.S.C. 154(b) by 0 days.

(21) Appl. No.: 09/527,722

(22) Filed: Mar. 17, 2000

Related U.S. Application Data

(63) Continuation-in-part of application No. 09/282,053, filed on Mar. 29, 1999.

(51) Int. Cl.$^7$ .................................... F04B 17/00
(52) U.S. Cl. ............... 417/423.1; 123/509; 415/55.1
(58) Field of Search .................. 417/423.7, 423.12, 417/244, 423.6, 423.1, 203, 423.3, 365, 313, 44.2; 123/509, 516, 514; 415/55.6, 55.1, 55.4

(56) References Cited

U.S. PATENT DOCUMENTS

| | | |
|---|---|---|
| 3,694,110 | 9/1972 | Guinard . |
| 3,877,845 * | 4/1975 | Green et al. ............... 417/423.7 |
| 4,396,358 | 8/1983 | De Concini . |
| 4,403,910 | 9/1983 | Watanabe et al. . |
| 4,445,820 | 5/1984 | Hayashi et al. . |
| 4,445,821 | 5/1984 | Watanabe et al. . |
| 4,449,891 * | 5/1984 | Kemmner ................ 417/423.12 |
| 4,451,213 | 5/1984 | Takei et al. . |
| 4,466,781 | 8/1984 | Kemmner . |
| 4,493,620 | 1/1985 | Takei et al. . |
| 4,508,492 | 4/1985 | Kusakawa et al. . |
| 4,573,882 | 3/1986 | Watanabe et al. . |
| 4,586,877 | 5/1986 | Watanabe et al. . |
| 4,591,311 | 5/1986 | Matsuda et al. . |
| 4,645,429 | 2/1987 | Asami et al. . |
| 4,648,809 | 3/1987 | Gensberger . |
| 4,672,937 * | 6/1987 | Fales et al. ................... 123/509 |
| 4,718,827 * | 1/1988 | Sutton et al. ................ 417/244 |
| 4,778,354 | 10/1988 | Idei . |

(List continued on next page.)

FOREIGN PATENT DOCUMENTS

WO 00/23705    4/2000   (WO) .

*Primary Examiner*—Teresa Walberg
*Assistant Examiner*—Leonid Fastovsky
(74) *Attorney, Agent, or Firm*—Reising, Ethington, Barnes, Kisselle, Learman & McCulloch, P.C.

(57) ABSTRACT

An in-tank fuel pump reservoir assembly for drawing fuel from a fuel supply tank and discharging the fuel under pressure to an engine. The assembly includes a reservoir canister that partially defines a reservoir chamber and is mounted within a fuel tank. A reservoir inlet admits fluid into the reservoir chamber from the fuel tank. A reservoir outlet allows fuel to flow from the reservoir chamber to an engine through a fuel line. A reservoir filling device draws fuel into the reservoir chamber from the fuel supply tank through the reservoir inlet. A fuel pump assembly disposed within the canister draws fuel from the reservoir chamber and discharges at least a portion of that fuel to the engine through the reservoir outlet. A modular fuel delivery pod includes the fuel pump assembly, the reservoir filling device, and the inlet check valve. The pod connects to the canister to cooperatively define the reservoir chamber. The assembly is readily adaptable to multiple fuel tank applications by selecting respective canisters and fuel pump assemblies that are compatible with such applications.

60 Claims, 18 Drawing Sheets

U.S. PATENT DOCUMENTS

| | | | |
|---|---|---|---|
| 4,784,587 | * 11/1988 | Takei et al. | 417/423.6 |
| 4,822,258 | 4/1989 | Matsuda et al. . | |
| 4,915,582 | 4/1990 | Nishikawa . | |
| 5,011,367 | 4/1991 | Yoshida et al. . | |
| 5,040,954 | 8/1991 | Iwai . | |
| 5,058,557 | 10/1991 | Frank et al. . | |
| 5,080,554 | 1/1992 | Kamimura . | |
| 5,096,391 | 3/1992 | Tuckey . | |
| 5,173,037 | 12/1992 | Martin et al. . | |
| 5,253,628 | * 10/1993 | Brown | 123/516 |
| 5,257,916 | 11/1993 | Tuckey . | |
| 5,332,369 | 7/1994 | Jensen . | |
| 5,338,151 | 8/1994 | Kemmner et al. . | |
| 5,338,165 | * 8/1994 | Brockner et al. | 417/423.1 |
| 5,348,452 | 9/1994 | Yamamoto et al. . | |
| 5,350,281 | 9/1994 | Hagshenas . | |
| 5,372,475 | 12/1994 | Kato et al. . | |
| 5,378,111 | * 1/1995 | Christopher | 417/203 |
| 5,378,125 | 1/1995 | Frank et al. . | |
| 5,391,062 | * 2/1995 | Yoshioka | 417/423.3 |
| 5,399,075 | * 3/1995 | Frank et al. | 417/423.1 |
| 5,401,147 | 3/1995 | Yu . | |
| 5,413,457 | * 5/1995 | Tuckey | 415/55.6 |
| 5,454,697 | 10/1995 | Nakanishi . | |
| 5,472,321 | * 12/1995 | Radermacher | 417/365 |
| 5,486,087 | 1/1996 | Treiber et al. . | |
| 5,498,124 | 3/1996 | Ito et al. . | |
| 5,511,957 | * 4/1996 | Tuckey et al. | 417/313 |
| 5,513,950 | 5/1996 | Yu . | |
| 5,525,048 | 6/1996 | Tuckey . | |
| 5,549,446 | 8/1996 | Gaston et al. . | |
| 5,551,835 | * 9/1996 | Yu et al. | 415/55.1 |
| 5,551,842 | 9/1996 | Schmid et al. . | |
| 5,560,342 | * 10/1996 | Fournier et al. | 123/509 |
| 5,571,001 | 11/1996 | Fukuda et al. . | |
| 5,586,858 | 12/1996 | Tuckey . | |
| 5,620,048 | 4/1997 | Beauquin . | |
| 5,624,245 | 4/1997 | DeClerck et al. . | |
| 5,630,399 | 5/1997 | Nomura et al. . | |
| 5,642,987 | 7/1997 | Taricco . | |
| 5,647,328 | * 7/1997 | Fournier et al. | 123/509 |
| 5,649,514 | * 7/1997 | Okada et al. | 123/514 |
| 5,674,057 | 10/1997 | Guardiani et al. . | |
| 5,680,700 | 10/1997 | Tuckey . | |
| 5,702,229 | * 12/1997 | Moss et al. | 415/55.4 |
| 5,762,049 | * 6/1998 | Jones et al. | 123/514 |
| 5,762,481 | 6/1998 | Oi . | |
| 5,787,865 | * 8/1998 | Harris et al. | 123/516 |
| 5,809,975 | * 9/1998 | Tuckey et al. | 123/509 |
| 5,810,568 | 9/1998 | Whitefield et al. . | |
| 5,833,437 | 11/1998 | Kurth et al. . | |
| 5,857,841 | 1/1999 | Kobayashi et al. . | |
| 5,890,880 | 4/1999 | Lustwerk . | |
| 5,961,293 | * 10/1999 | Clemmons et al. | 417/44.2 |
| 6,019,570 | * 2/2000 | Talaski | 415/55.1 |
| 6,113,362 | * 9/2000 | Schmieder et al. | 417/423.1 |

\* cited by examiner

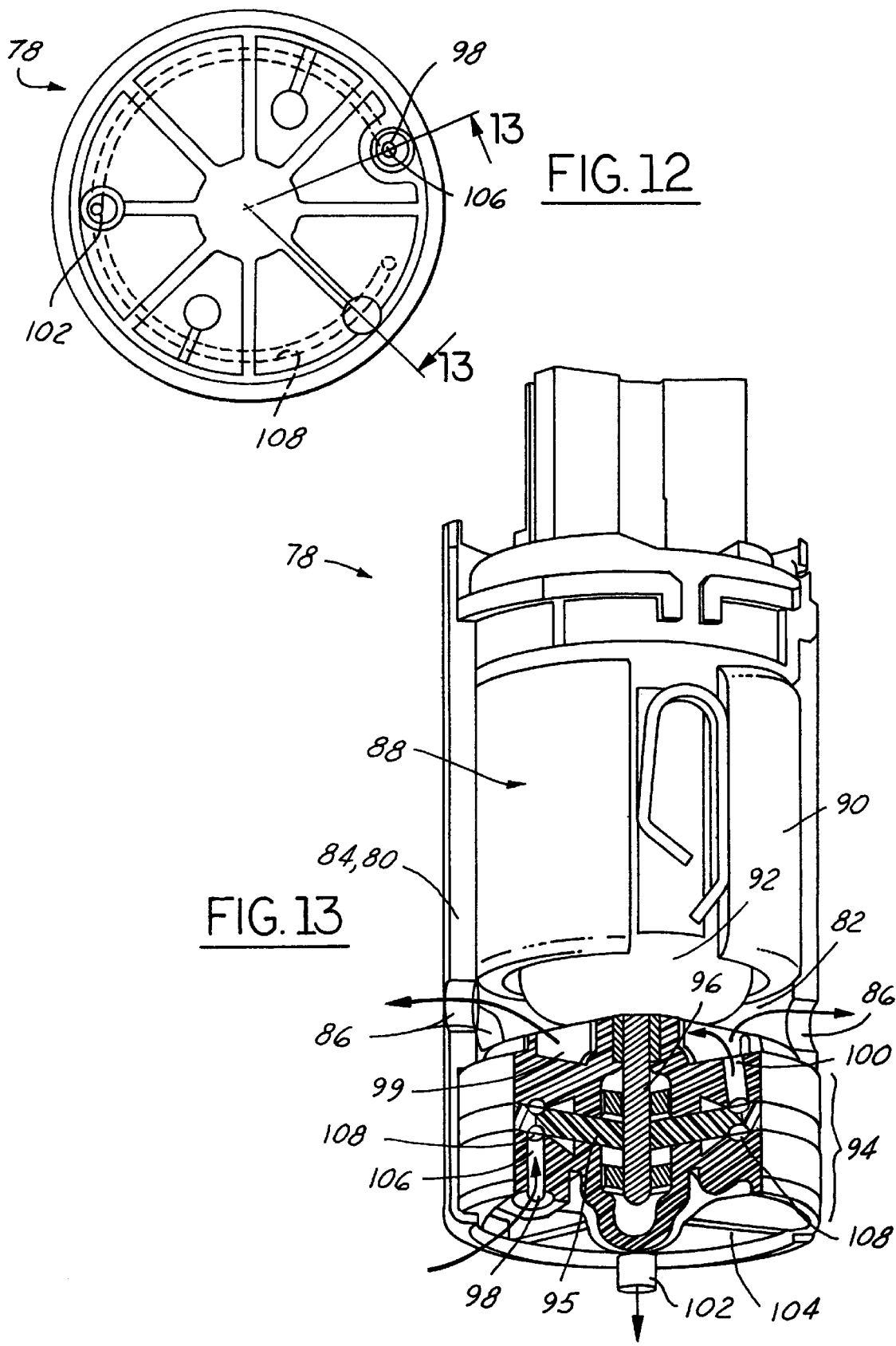

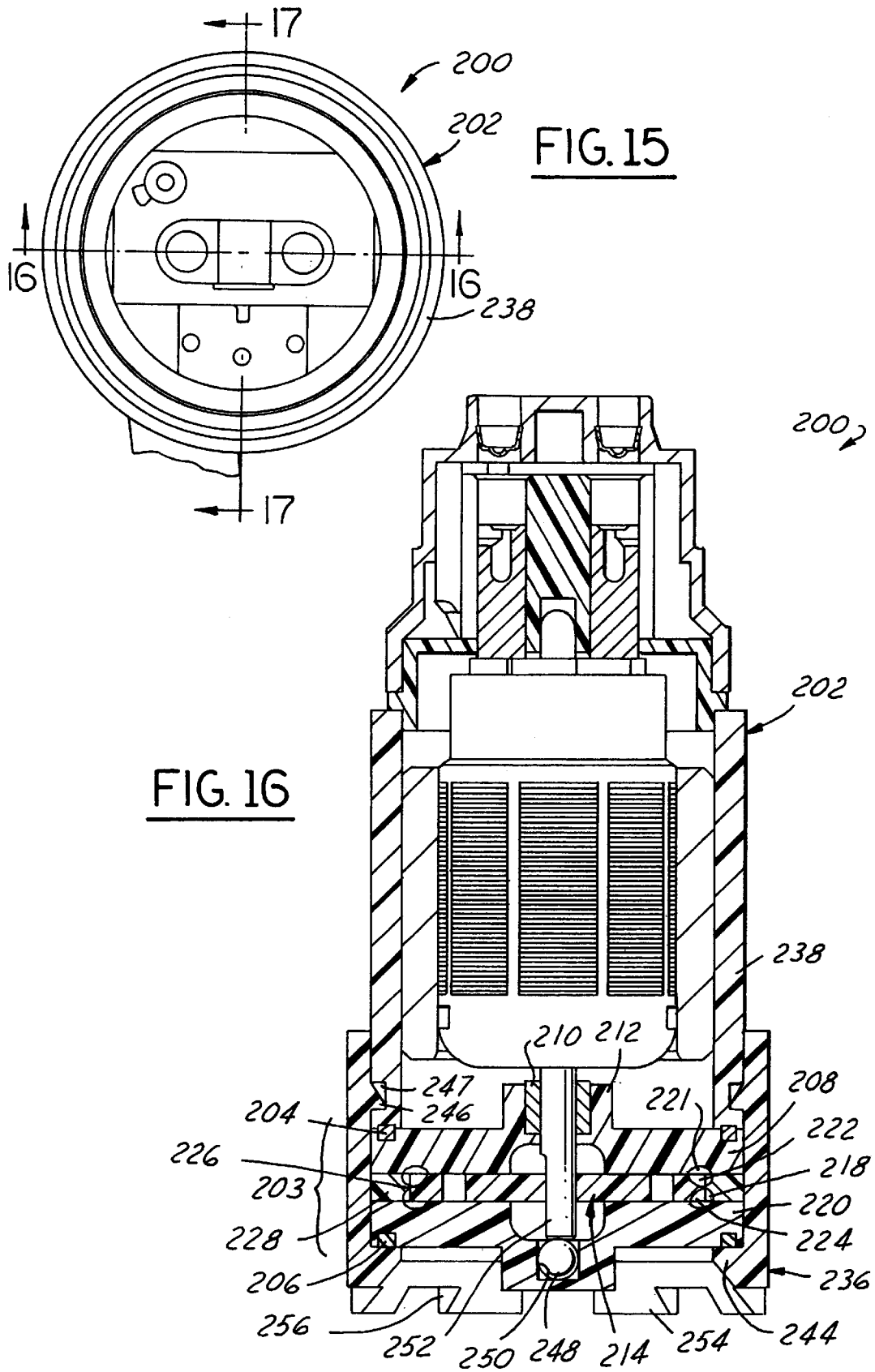

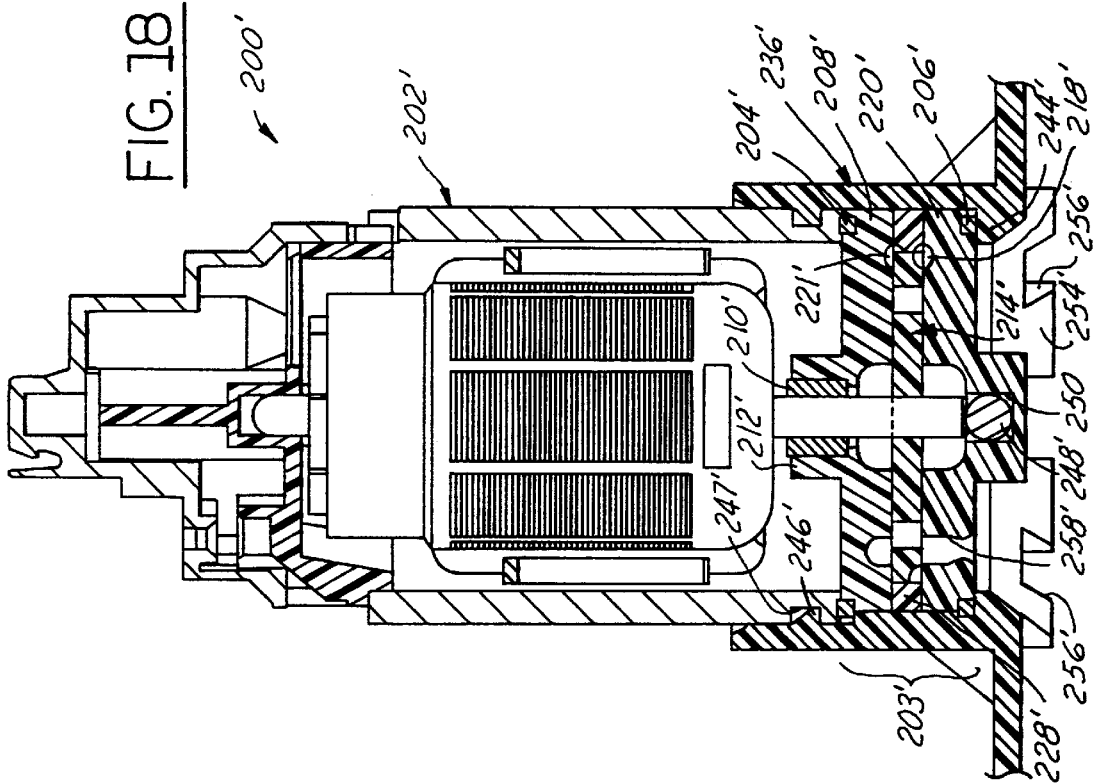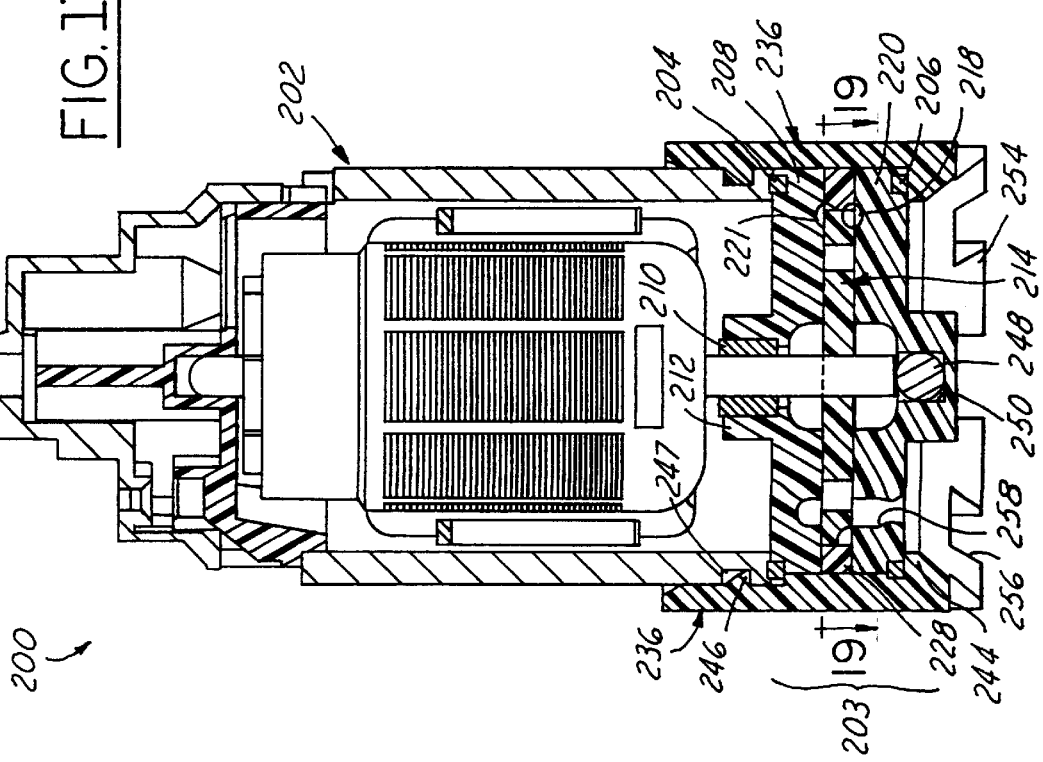

IN-TAKE FUEL PUMP RESERVOIR

This is a Continuation-in-Part application of co-pending application Ser. No. 09/282,053, filed on Mar. 29, 1999 entitled "Fuel Pump With Low Pressure Motor Chamber."

FIELD OF THE INVENTION

This invention relates generally to fuel delivery systems using electric motor fuel pumps.

BACKGROUND OF THE INVENTION

In-tank fuel pump reservoir assemblies have been employed in automotive engine fuel delivery systems and similar applications to draw fuel from a fuel supply tank and deliver that fuel under pressure to an engine. In-tank fuel pump reservoir assemblies generally include a fuel reservoir canister that is suspended within a fuel supply tank from a mounting plate fastened across an opening in an upper wall or side wall of the fuel supply tank. The canister defines a reservoir chamber for holding a relatively small quantity of fuel. Fuel pump reservoir assemblies of this type also include a reservoir outlet that connects to a fuel line leading to an engine through the mounting plate and a reservoir inlet positioned to provide a one-way fluid path from the supply tank to the reservoir chamber. An electric fuel pump assembly is supported within the reservoir canister and has a fuel pump inlet in fluid communication with the reservoir chamber. The electric fuel pump also has a fuel pump exhaust in fluid communication with the reservoir outlet. The electric fuel pump assembly draws fuel from the reservoir chamber through the fuel pump inlet and delivers at least a portion of that fuel to the engine through the reservoir outlet. An inlet filter is typically disposed between the reservoir chamber and the pump inlet and an outlet filter is typically disposed between the pump exhaust and the reservoir outlet. It is also known for an in-tank fuel pump reservoir assembly to include a reservoir filling device such as a jet pump or venturi that is supported within the reservoir canister in fluid communication with the reservoir inlet. The reservoir-filling device would be included to draw fuel into the reservoir chamber from the fuel supply tank through the reservoir inlet and an inlet check valve. An inlet check valve, or "foot valve", is included to prevent fuel from exiting the reservoir chamber through the reservoir inlet. An outlet check valve prevents fuel from back flowing through the electric fuel pump and into reservoir chamber. Some in-tank fuel pump reservoir assemblies also include a fuel pressure regulator supported within the reservoir in fluid communication with the fuel pump exhaust and the reservoir outlet. The fuel pressure regulator is configured to limit reservoir assembly output pressure by metering a portion of high-pressure fuel from the fuel pump exhaust back to the reservoir or the supply tank. In-tank fuel pump reservoir assemblies must be modified to accommodate various output and configuration requirements peculiar to different vehicle applications. This generally requires extensive retooling to provide a compatible for each separate application.

The electric fuel pumps used in in-tank fuel pump reservoir assemblies may be of the electric motor regenerative type that typically include housings adapted to be immersed in fuel typically in a supply tank with an inlet for drawing liquid fuel from a surrounding tank and an outlet for feeding fuel under pressure to the engine. The electric motor powering such a pump includes a rotor mounted for rotation within the housing and connected to a source of electrical power for driving the rotor for rotation about its axis. An impeller is coupled to the rotor for co-rotation with the rotor and has a circumferential array of vanes about the periphery of the impeller. An arcuate pumping channel with an inlet port and an outlet port at opposed ends of the channel surrounds the impeller periphery for developing fuel pressure through a vortex like action on the liquid fuel between pockets formed by the impeller vanes and the surrounding channel.

One example of a fuel pump of this type is illustrated in U.S. Pat. No. 5,257,916. In fuel pumps of this type, the outlet port of the pumping channel discharges into a chamber of the fuel pump housing containing the electric motor to cool the electric motor as the fuel flows past the motor and out of the outlet of the housing to supply fuel under pressure to an operating engine. While generally effective at cooling the electric motor, pumps of this type have the disadvantage of heating the fuel. Another disadvantage of fuel pumps of this type is the resistance they provide to the flow of fluid being pumped through the electric motor portion of the pump. This resistance limits the efficiency of such pumps.

SUMMARY OF THE INVENTION

An electric motor fuel pump in accordance with the present invention includes a housing having a fuel inlet and a fuel outlet, an electric motor chamber in the housing to receive the electric motor, a fuel pumping mechanism driven by the motor and having an inlet port and an outlet port, and a fuel passage defined by the housing independent of the electric motor chamber and interconnecting the outlet port of the fuel pumping mechanism with the fuel outlet of the housing. Pressurized fuel discharged from the fuel pumping mechanism is routed through the fuel passage, away from the electric motor chamber, to be delivered through the fuel outlet of the fuel pump housing to an operating engine. Preferably, the motor chamber is vented to the surrounding fuel tank to permit fuel vapor in the electric motor chamber to be discharged into the fuel tank. The vent also permits any fuel that leaks from the pumping mechanism to the electric motor chamber to be discharged into the fuel tank. Desirably, fuel leakage from the pumping mechanism to the electric motor chamber cools the electric motor.

In one embodiment of the invention, a metallic flux tube surrounds the rotor and an outer housing shell surrounds the flux tube to define between them fuel passage which communicates the outlet port of the fuel pumping channel with the fuel outlet of the fuel pump housing. Also, a vapor purge port may be provided communicating the electric motor chamber with the fuel pumping channel because of the low pressure within the electric motor chamber. With previous fuel pumps, this was not possible due to the high pressure existing within the electric motor chamber.

According to another aspect of the invention, an in-tank fuel pump reservoir assembly is provided for drawing fuel from a fuel supply tank and delivering the fuel under pressure to an engine. The assembly includes a reservoir chamber partially defined by a fuel reservoir canister. The canister is configured for mounting within a fuel supply tank. A reservoir inlet is disposed between the fuel supply tank and reservoir chamber and is configured to provide fluid communication between the fuel supply tank and the reservoir chamber. A reservoir outlet is disposed between the reservoir chamber and an engine and is configured to provide fluid communication between the reservoir chamber and the engine. A reservoir filling device is disposed between the reservoir inlet and the reservoir chamber and is configured to draw fuel into the reservoir chamber from the fuel supply tank through the reservoir inlet. A fuel pump assembly is disposed within the canister and is configured to draw fuel from the reservoir chamber and to deliver at least a portion of that fuel to the engine through the reservoir outlet. The in-tank fuel pump reservoir also includes a modular fuel delivery pod comprising the fuel pump assembly, the reservoir filling device, and the inlet check valve. The pod is connectable to the canister to cooperatively define the reservoir chamber.

The invention also includes a method for making an in-tank fuel pump reservoir. The method includes providing a fuel delivery pod, providing a fuel reservoir canister and assembling the fuel delivery assembly by connecting the fuel reservoir canister to the fuel delivery pod. The method further includes installing the fuel delivery assembly in a fuel supply tank.

Objects, features and advantages of this invention include an in-tank fuel pump reservoir assembly that is readily adaptable to various vehicle and fuel tank applications and can support a larger check valve optimized for minimum flow loss and noise generation; an electric fuel pump assembly that allows foot valve, pump inlet and jet pump heights to be reduced; an electric fuel pump assembly that routes pressurized fuel discharged from a fuel pumping mechanism away from the electric motor portion of the assembly; and an electric fuel pump assembly that reduces flow-through losses, reduces commutator wear by minimizing introduction of fresh hostile fuels, reduces nonconductive deposit accumulations on commutator brushes, increases fuel pumping efficiency, decreases the heat transferred to the fuel before it is discharged from the fuel pump, improves the venting of fuel vapor from the fuel pump, lowers the electric current draw of the fuel pump; all of which are of relatively simple design and economical manufacture and assembly, are reliable and in service have long, useful lives.

BRIEF DESCRIPTION OF THE DRAWINGS

These and other objects, features and advantages of this invention will be apparent from the following detailed description of the preferred embodiment and best mode, appended claims and accompanying drawings in which:

FIG. 12 is a diagrammatic bottom view of the fourth alternate fuel pump embodiment;

FIG. 13 is a partially cut-away, partial cross-sectional perspective view of the fourth alternate fuel pump embodiment taken along line 13—13 of FIG. 12;

FIG. 15 is a top view of the fourth alternate fuel pump embodiment of FIG. 14;

FIG. 16 is a partial cross-sectional view of the fourth alternate fuel pump embodiment of FIG. 14 taken along line 16—16 of FIG. 15;

FIG. 17 is a partial cross-sectional view of the fourth alternate fuel pump embodiment of FIG. 14 taken along line 17—17 of FIG. 15;

FIG. 18 is a partial cross-sectional view of the fourth alternate fuel pump embodiment of FIG. 14 taken along line 17—17 of FIG. 15 modified such that a pumping mechanism housing of the fuel pump is integrally formed with the pod shell;

DETAILED DESCRIPTION OF THE PREFERRED EMBODIMENTS

Figure 1:
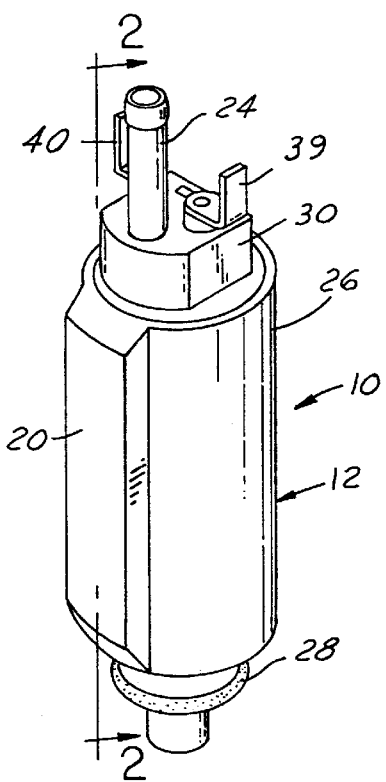
FIG. 1 is a perspective view of a first embodiment of an electric motor fuel pump embodying the present invention.
Figure 2:
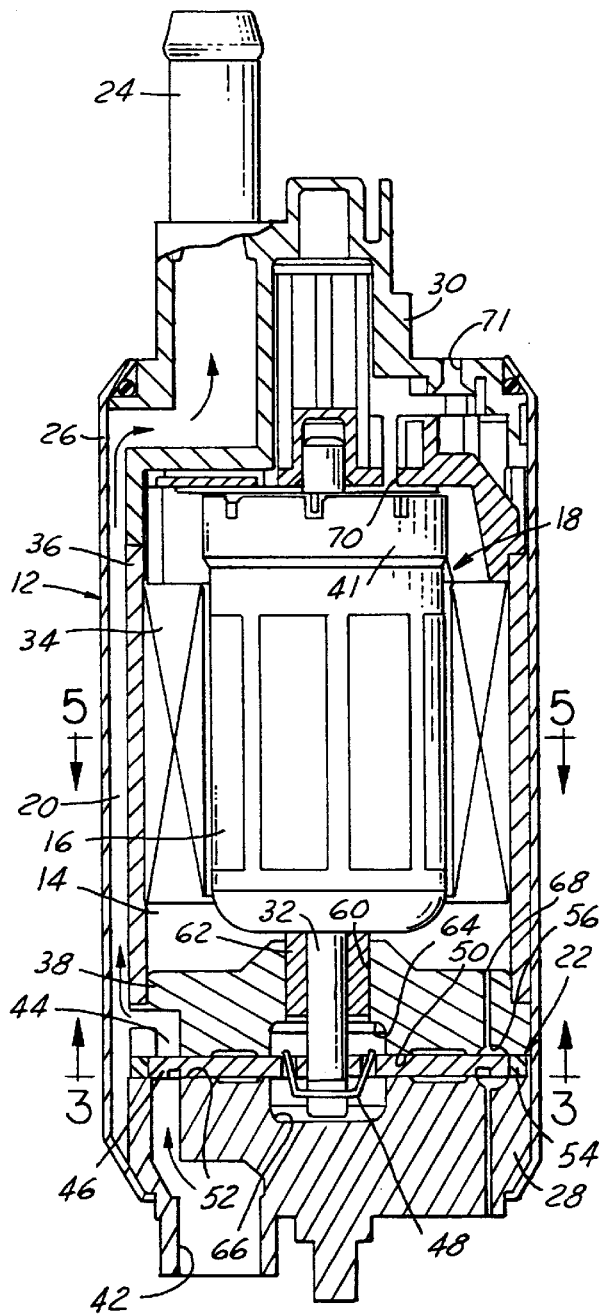
FIG. 2 is a cross sectional view taken along line 2—2 of FIG. 1.
Figure 5:
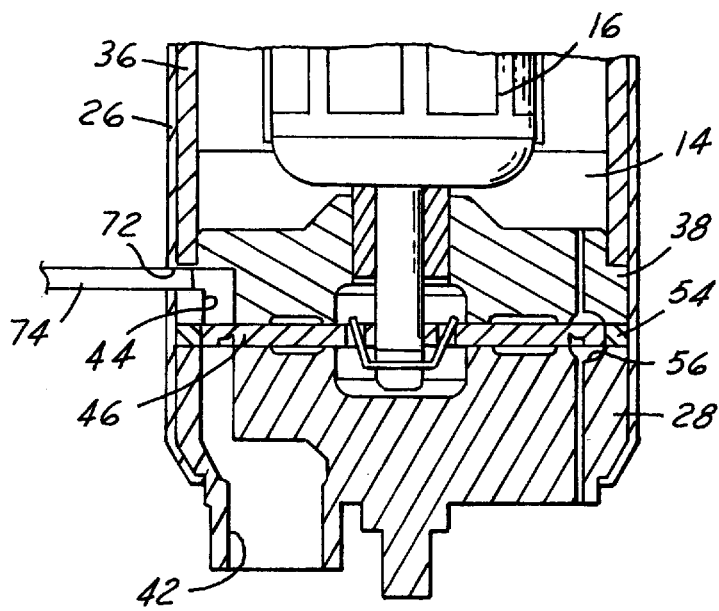
FIG. 5 is a cross sectional view of a second fuel pump embodiment.
Figure 6:
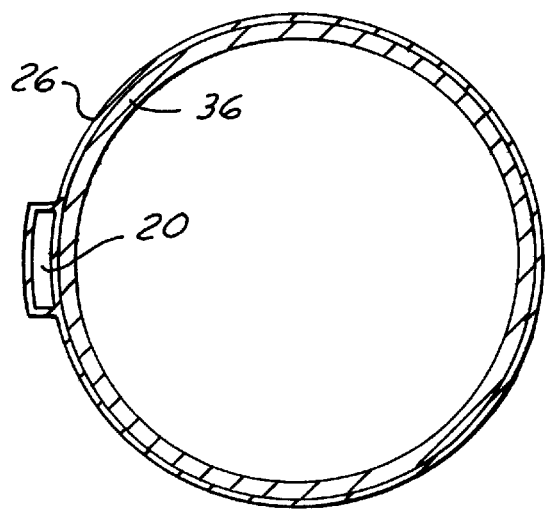
FIG. 6 is a cross sectional view of an outer shell and flux tube of a third fuel pump embodiment.
Figure 7:
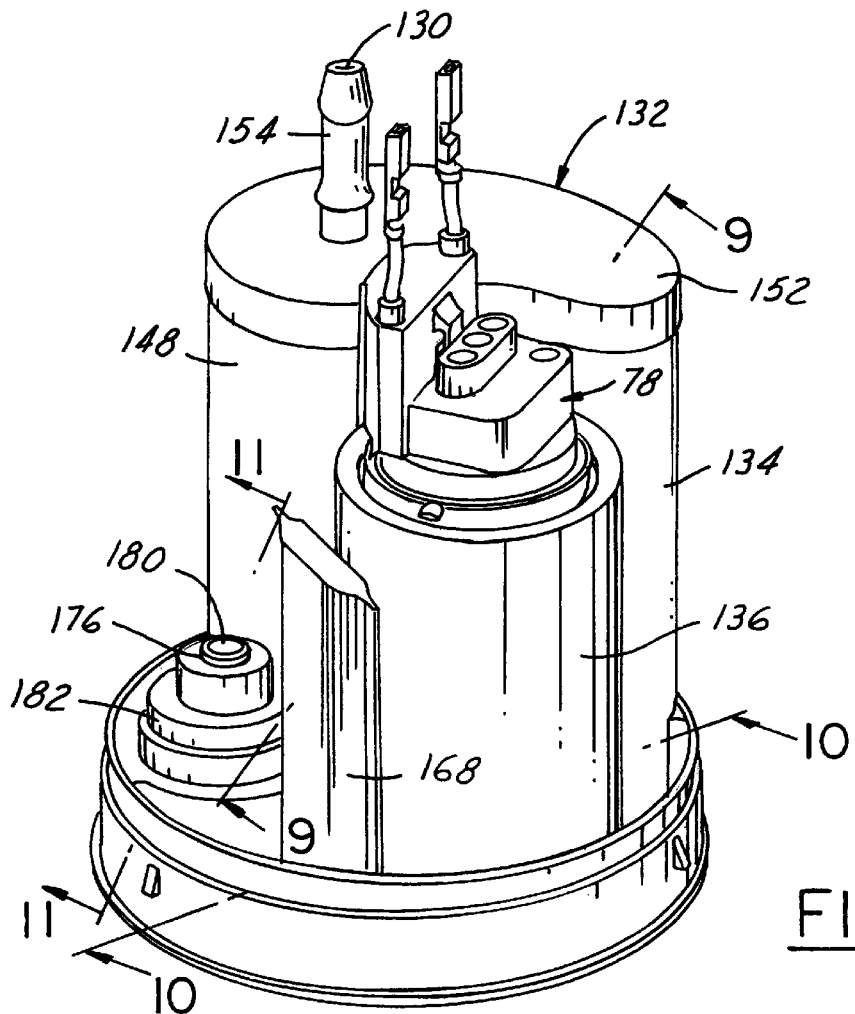
FIG. 7 is a perspective view of a fuel delivery pod portion of an in-tank fuel pump reservoir assembly embodying the present invention and including a fourth alternate fuel pump embodiment.

Referring in more detail to the drawings, FIGS. 1 and 2 illustrate an electric motor fuel pump 10 in accordance with a first embodiment of the invention. Second and third pump embodiments are shown in FIGS. 5 and 6, respectively. A fourth pump embodiment is shown at 78 in FIGS. 7–13, a fifth pump embodiment is shown at 200 in FIGS. 14–23, and a sixth pump embodiment is shown at 300 in FIGS. 24–35. Unless indicated otherwise, descriptions of elements in one embodiment will also apply to the same or similar elements in subsequent embodiments.

The first pump embodiment includes a housing 12 which defines an electric motor chamber 14 in which is received a rotor 16 of an electric motor 18, and a fuel passage 20 separate from the electric motor chamber 14 and through which fuel discharged from a fuel pump assembly 22 is routed to an outlet 24 of the fuel pump housing 12 for delivery of the fuel under pressure to an operating engine. Preferably, the fuel pump housing 12 has a cylindrical case or shell 26 that joins axially spaced inlet and outlet end caps 28,30, respectively.

The electric motor rotor 16 is journalled by a shaft 32 for rotation within the housing 12 and is surrounded by a permanent magnet stator 34. A flux tube 36 surrounds the stator 34 and is telescopically received over a portion of the outlet end cap 30 and an outlet port plate 38 at the other end of the flux tube 36. Brushes (not shown) are disposed within the outlet end cap 30 and are electrically connected to terminals 39,40 extending from the end cap 30. The brushes are urged into electrical sliding contact with a commutator 41 fixed to the rotor 16 for rotation therewith on the shaft 32 and within the housing 12. The rotor 16 is coupled to the fuel pump assembly 22 for pumping fuel from an inlet passage 42 formed through the inlet end cap 28, through the pump assembly 22 and to an outlet passage 44 formed in the outlet port plate 38 to increase the pressure of the liquid fuel for delivery to the operating engine. The output pressure of the fuel pump may be on the order of between 40 psi and 90 psi or more.

In the first pump embodiment, the pump assembly 22 includes an impeller 46 coupled to the shaft 32 by a wire clip 48 for co-rotation with the shaft 32. The impeller 46 is rotated between opposed generally flat faces 50,52 of the outlet port plate or upper cap 38 and the inlet end or lower cap 28 and within a guide ring 54 sandwiched between the outlet port plate 38 and the inlet end cap 28.

A pumping channel 56 is defined about the periphery of the impeller 46 with the inlet end cap 28, outlet port plate 38 and guide ring 54. Preferably, the inlet end cap 28 and outlet port 38 plate have arcuate grooves formed therein which define the lower and upper portions of the pumping channel 56. The arcuate pumping channel 56 extends circumferentially from the inlet port 42 to the outlet passage 44 and typically about 300 to 330°. To the extent thus far described, the fuel pump 10 is substantially as shown in U.S. Pat. No. 5,257,916, the disclosure of which is incorporated herein by reference.

Figure 3:
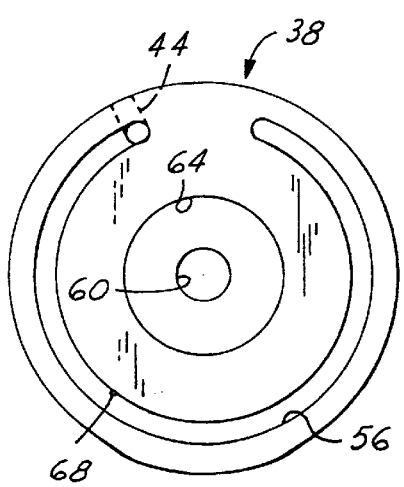
FIG. 3 is a bottom view of an outlet port plate of the fuel pump of FIG. 1.

As shown in FIGS. 2 and 3, the outlet port plate 38 has a central through bore 60 which receives the shaft 32 and preferably a bearing or bushing 62 which journals the shaft 32 for rotation relative to the outlet port plate 38. Opposed, generally aligned central recesses 64,66 in both the outlet port plate 38 and the inlet end cap 28 provide clearance for the clip 48 as it rotates with the shaft 32 and impeller 46. Desirably, a vapor purge port 68 may be formed through the outlet port plate 38 communicating the fuel pumping channel 56 with the electric motor chamber 14 to permit fuel vapor to escape from the fuel pumping channel 56 to thereby decrease the quantity of fuel vapor in fuel discharged from the fuel pump. The outlet passage 44 formed in the outlet port plate 38 is shaped, as shown in FIG. 2, to communicate the fuel pumping channel 56 with the fuel passage 20 defined between the outer shell 26 of the fuel pump housing 12 and the flux tube 36.

The outlet end cap 30 defines the fuel outlet 24 of the housing 12 which is constructed to receive one end of a fuel line through which fuel is delivered to the engine. To communicate the motor chamber 14 with the surrounding fuel tank, an opening 70 is provided in communication with an opening 71 extending through the outlet end cap 30.

Figure 4:
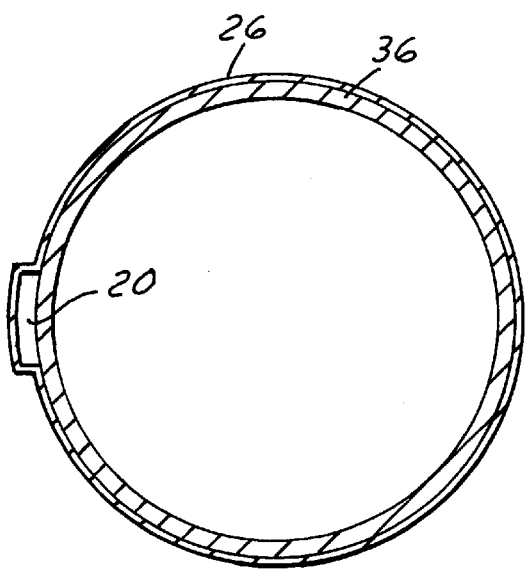
FIG. 4 is a cross sectional view of the outer shell and flux tube of the fuel pump of FIG. 1.

As shown in FIGS. 2 and 4, the fuel passage 20 is preferably defined between the shell 26 and the flux tube 36. As shown in FIGS. 1 and 4, the fuel passage 20 covers only a limited arcuate extent of the flux tube 36 although, if desired, a greater or lesser arcuate extent of the flux tube 36 may be contacted by liquid fuel to control the amount of heat energy transferred to the fuel by the flux tube 36.

Alternatively, as shown in FIG. 5, an outlet port 72 may be formed through the shell 26 of the fuel pump housing 12 to communicate directly with the outlet passage 44 to deliver fuel to an operating engine through a fuel line 74. As another alternative, as shown in FIG. 6, the fuel passage 20 may be formed completely in the fuel pump housing shell 26 to decrease the likelihood of fuel leakage from the fuel passage 20.

In use, fuel is drawn from the fuel tank into the fuel pumping channel 56 through the inlet port 42 of the inlet end cap 28. Fuel is circulated in the pumping channel 56 by the impeller 46 to increase its velocity and is discharged from the pumping channel 56 through the outlet passage 44. From the outlet passage 44 fuel flows through the fuel passage 20 and then the outlet 24 for delivery of the fuel under pressure to an operating engine. Fuel leakage within the fuel pump housing 12, such as between the rotating shaft 32 and the bushing 62, or through the vapor purge port 68 located in the outlet port plate 38 allows a limited amount of fuel to flow into the electric motor chamber 14. The fuel and fuel vapor in the electric motor chamber 14 helps to cool the electric motor 18 and exits the electric motor chamber 14 through the openings 70,71 through the outlet end cap 30 and is returned to the fuel tank.

The pressure in the motor chamber 14 is preferably less than 50% of the outlet pressure of the fuel pump. It is currently believed that the low pressure in the motor chamber 14 reduces the resistance to rotation of the rotor 16 as compared to prior fuel pumps wherein the motor chamber was at the same pressure as the high pressure fuel discharged from the fuel pump into the motor chamber. Further, the electric motor chamber 14 preferably is not completely filled with liquid fuel such that the centrifugal force imparted on the liquid fuel by the spinning rotor 16 moves the fuel generally radially outwardly away from the rotor 16. This provides a vapor barrier adjacent the rotor 16 as the heavier liquid fuel is forced outwardly away from the rotor 16 within the housing 12. It is also presently believed that the vapor barrier surrounding the rotor 16 further reduces the resistance to rotation of the rotor 16 which decreases the electric current draw of the motor 18 and increases the efficiency of the fuel pump 10. Also, the reduced pressure in the motor chamber 14 is believed to increase the amount of fuel vapor in the motor chamber, reducing resistance to rotation of the rotor 16. Regardless of the theoretical explanation, empirical data has shown that an electric motor fuel pump 10 constructed according to the present invention has a significant increase in overall fuel pump efficiency. Still further, less heat is transferred to the fuel delivered to the engine as it passes through the fuel pump 10. Desirably, this may reduce fuel vapor formation in the fuel delivered to the engine and should reduce fuel vapor formation in the fuel tank.

In the fourth pump embodiment, a flux tube serves as a pump housing. As is best shown in FIG. 13, a combined flux tube/housing 80 defines a motor chamber 82 and a generally cylindrical metal side wall 84 that includes a plurality of circumferentially-spaced circular pump housing outlets 86. The plurality of housing outlets 86 are positioned to direct high pressure fuel radially outward from the fuel pump assembly rather than axially through the motor chamber 82. An electric motor 88 is disposed within the motor chamber 82 and includes a stator 90 and a rotating armature 92.

A turbine-type fuel pumping mechanism 94 is disposed in and is supported by the flux tube/housing 80. The mechanism 94 is spaced axially from the motor 88. The fuel pumping mechanism 94 includes a flat disk impeller 95 that is fixed to and is rotated by a drive axle 96 extending from the motor 88. The fuel pumping mechanism 94 is configured to draw fuel in through a pump assembly inlet 98 and to discharge approximately 95% of that fuel at high pressure through a first pump exhaust 100.

Figure 8:
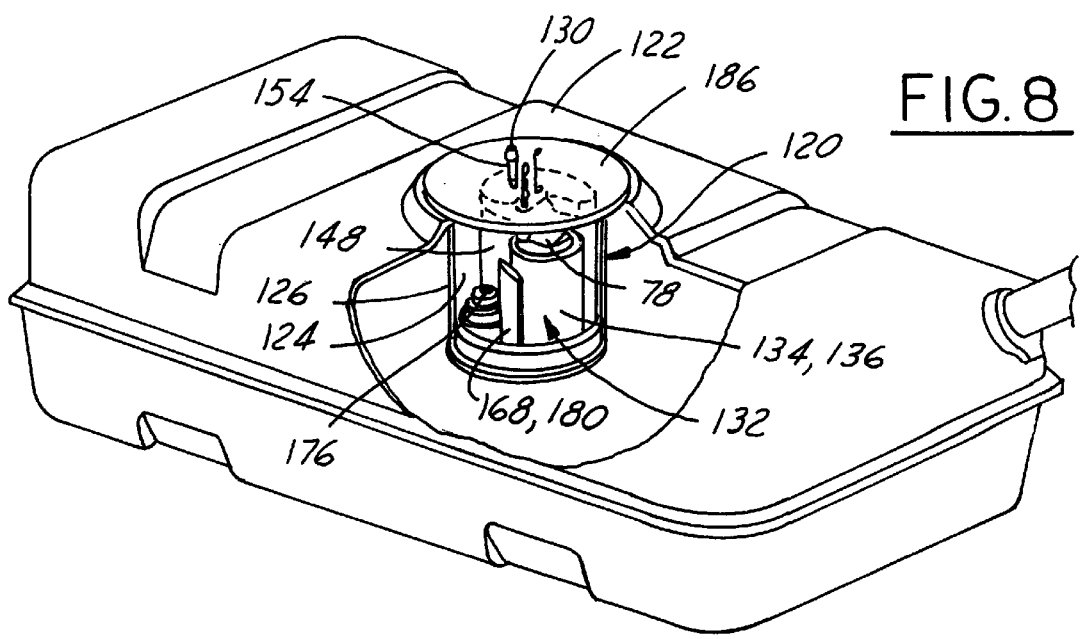
FIG. 8 is a perspective view of an in-tank fuel pump reservoir assembly embodying the present invention, including the fuel delivery pod of FIG. 7 and shown installed in a vehicle fuel supply tank.
Figure 9:
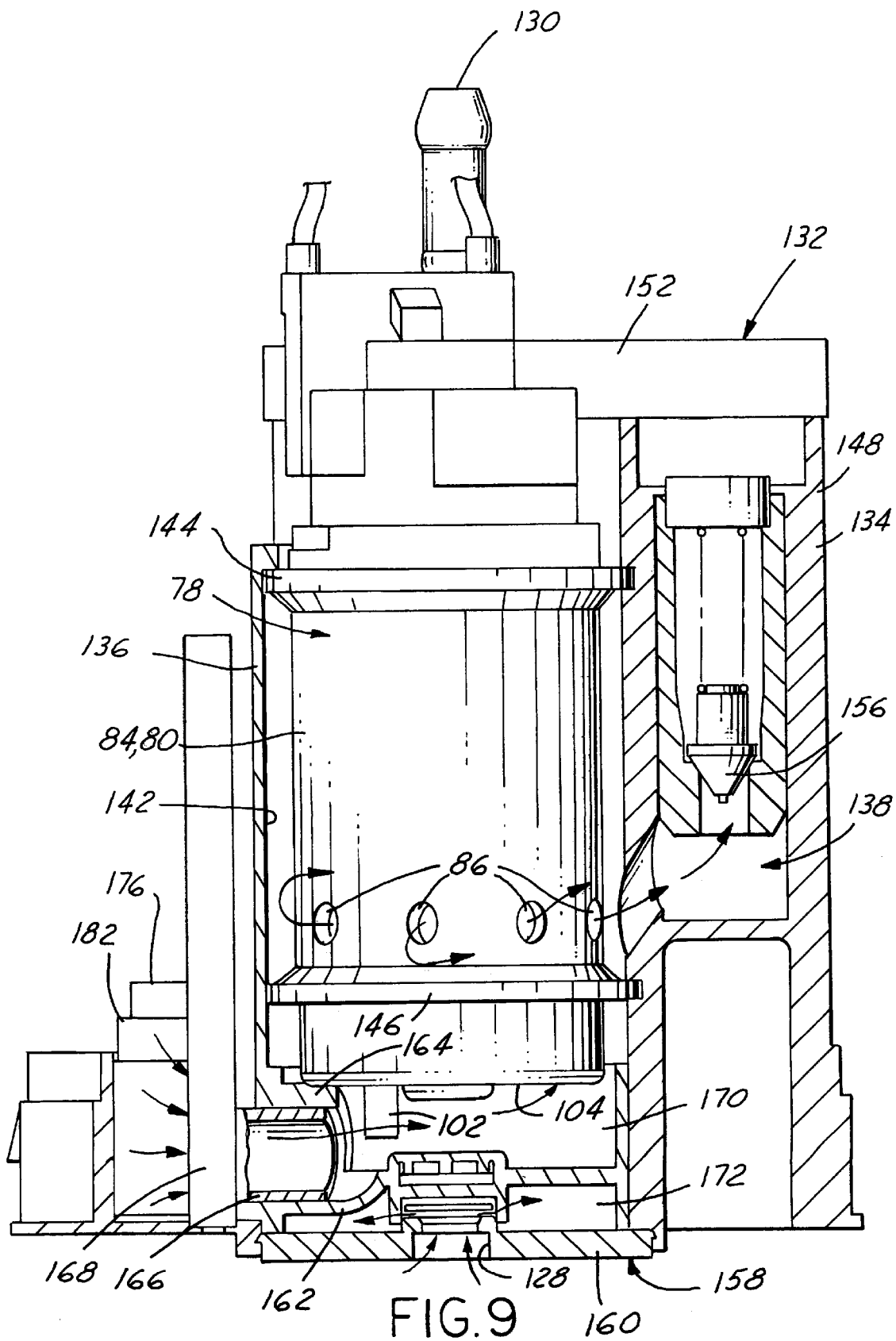
FIG. 9 is a partial cross-sectional view of the fuel delivery pod of FIG. 7 taken along line 9—9 of FIG. 7.
Figure 10:
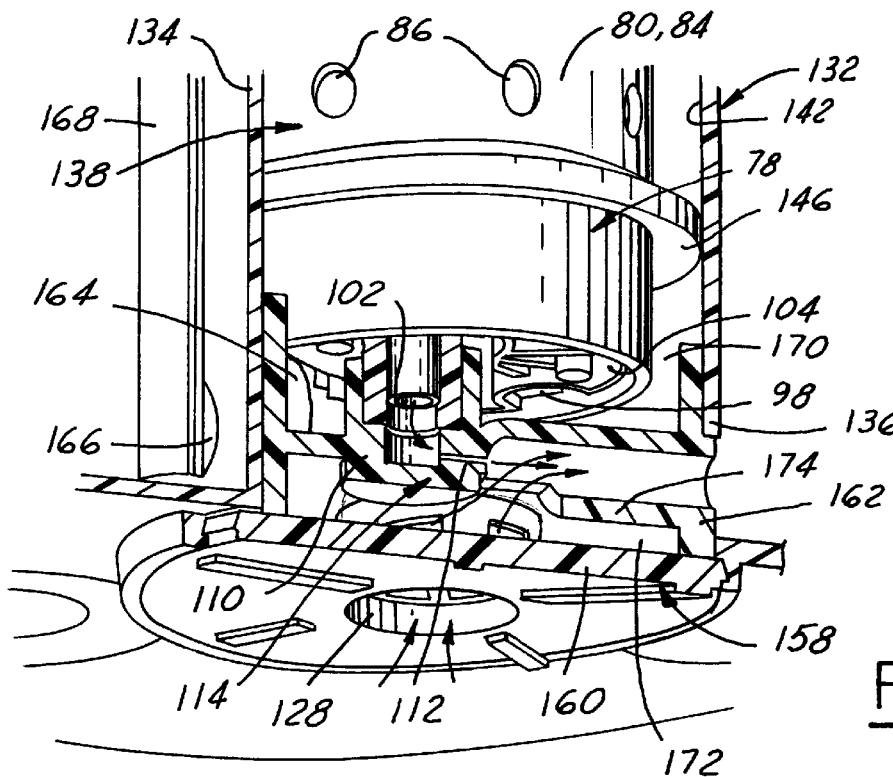
FIG. 10 is a fragmentary, partial cross-sectional view of the fuel deliver pod of FIG. 7 taken along line 10—10 of FIG. 7.

With the exception of the following, the structure and function of the fuel pumping mechanism 94 of the fuel pump assembly shown in FIGS. 7–13 are generally the same as described above with reference to the embodiments of FIGS. 1–6 and in U.S. Pat. No. 5,525,048 which is assigned to the assignee of the present invention and is incorporated herein by reference. The fuel pumping mechanism 94 of FIGS. 7–13 is configured to discharge the remaining approximately 5% of fuel drawn in through the pump assembly inlet 98 through a second pump exhaust 102 extending from an axial bottom end surface 104 of the pumping mechanism 94. As is best shown in FIG. 12, the second pump exhaust 102 includes a passage 106 that taps into an arcuate fuel pumping channel 108 of the fuel pumping mechanism 94 at a point along the channel 108 at which fuel can be drawn off at a lower pressure than at the first pump exhaust 100. As shown in FIG. 10, the second pump exhaust 102 is defined by a tubular extension that is shaped to be received within a complementary-shaped jet pump venturi inlet such as that shown at 110 in FIG. 10.

A fuel passage 99 communicates the first pump exhaust 100 with the housing outlet and is configured to allow high pressure fuel to bypass the motor 88 while moving from the first pump exhaust 100 to the housing outlets 86. The fuel passage 99 is defined by the sidewall 84 of the flux tube/ housing 80, the motor 88 and an upper surface of the fuel pumping mechanism 94. As is best shown in FIG. 13, the shape of the fuel passage 99 allows a small amount of fuel to circulate between the stator 90 and the armature 92 of the motor 88 while directing most of the fuel discharged by the pumping mechanism 94 directly out the housing outlets 86. Because only a small amount of fuel circulates between the stator 90 and armature 92, less heat energy is imparted to fuel discharged from the fuel pump assembly 78. Causing the majority of the fuel pumping mechanism output to bypass the motor 88 has also been found to significantly increase the efficiency of the pump assembly 78.

An intake fuel pump reservoir assembly for drawing fuel from a fuel supply tank 122 and delivering the fuel under pressure to an engine is generally indicated at 120 in FIG. 8 where the pump reservoir assembly is shown installed in a fuel supply tank 122. The fuel pump reservoir assembly 120 includes a reservoir chamber 124 partially defined by a fuel reservoir canister 126. The canister 126 is configured for mounting within the fuel supply tank 122. A reservoir inlet, shown at 128 in FIGS. 9 and 10, is disposed between the fuel supply tank 122 and the reservoir chamber 124 and is configured to provide fluid communication between the fuel supply tank 122 and the reservoir chamber 124. The fuel pump reservoir assembly 120 also includes a reservoir outlet, shown at 130 in FIGS. 7–9 and 11, disposed within the canister 126 between the reservoir chamber 124 and an engine fed by the fuel pump reservoir assembly 120. The reservoir outlet 130 is configured to provide fluid communication between the reservoir chamber 124 and the engine. A reservoir-filling device such as a jet pump 114 is disposed within the canister 126 between the reservoir inlet 128 and the reservoir chamber 124. The reservoir-filling device 114 is configured to draw fuel into the reservoir chamber 124 from the fuel supply tank 122 through the reservoir inlet 128. The fuel pump assembly, shown at 78 in FIGS. 9–13, is disposed within the canister 126 and includes a fuel pump assembly inlet 98 that is in fluid communication with the reservoir chamber 124. As is also described in detail above, the fuel pump assembly 78 also includes a first fuel pump assembly outlet 86 that is in fluid communication with the reservoir outlet 130. The fuel pump assembly 78 is configured to draw fuel from the reservoir chamber 124 through the fuel pump assembly inlet 98 and to deliver a majority of that fuel to the engine through the reservoir outlet 130 as described above.

The fuel pump reservoir assembly 120 also includes a modular fuel delivery pod shown at 132 in FIGS. 7–11. The pod 132 is shaped to connect to the canister 126 in a way as to cooperate with the canister 126 to define the reservoir chamber 124. As such, the fuel pump reservoir assembly 120 is readily adaptable to different fuel tank applications by either forming or selecting respective canisters 126 that are compatible with each such fuel tank application.

The pod 132 includes a pod shell 134 that is molded into a shape that includes a fuel pump assembly receptacle 136 configured to receive any one of a number of different fuel pump assemblies. (In other embodiments the pod shell 134 may be fabricated by any suitable means known in the art such as stamping or casting). Fuel pump assemblies that are receivable into the fuel pump assembly receptacle 136 include the three fuel pump assembly embodiments described above and the fourth, fifth and sixth pump assembly embodiments described below. This allows the pod shell 134 to be tooled only one time and then used across multiple platforms having different fuel pump assembly requirements thereby resulting in higher volume output and lower cost.

The fuel pump assembly receptacle 136 of the pod shell 134 is configured to accommodate different fuel pump assemblies, as described above, to simplify adaptation of the fuel pump reservoir assembly 120 for use with vehicle applications that require different fuel pump assemblies.

Figure 11:
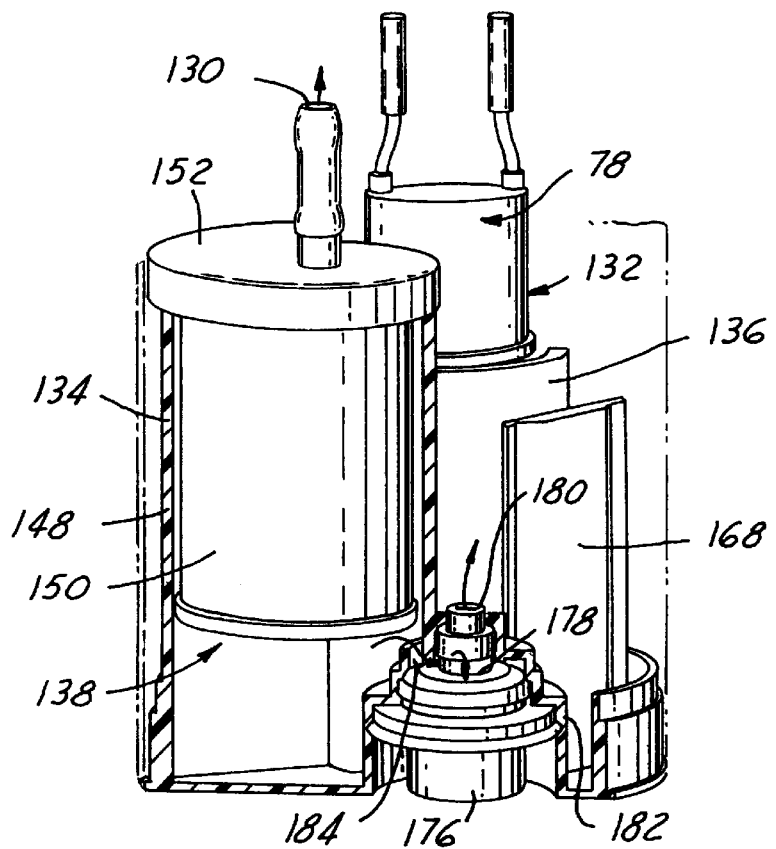
FIG. 11 is a partial cross-sectional view of the in-tank fuel pump reservoir assembly of FIG. 8 taken along line 11—11 of FIG. 7 with a reservoir canister of the assembly shown in phantom.

The fuel delivery pod 132 also includes a fuel output channel shown at 138 in FIGS. 9–11. The fuel output channel 138 is formed in the pod shell 134 and provides fluid communication between the first fuel pump assembly outlet 86 and the reservoir outlet 130 to eliminate the need for a connecting hose.

The first fuel pump assembly outlet 86 extends through a sidewall 84 of the fuel pump assembly 78 and includes a plurality of circumferentially spaced circular apertures that direct fuel radially outward from around the fuel pump assembly 78. The fuel output channel 138 formed in the pod shell 134 includes an annular cylindrical collection chamber 142 defined by and disposed between the fuel assembly receptacle 136 and the sidewall 84 of the pump. Upper and lower ring seals 144, 146 define upper and lower ends of the annular collection chamber portion 142 of the fuel output channel 138. The collection chamber 142 is shaped and positioned to collect and direct fuel discharge radially from the first fuel pump assembly outlets 136 of a variety of different fuel pump assemblies having outlets located at various positions on their respective sidewalls 84. In other embodiments, the upper seal 144 may be removed to accommodate fuel pump assemblies having primary pump outlets located at their respective upper ends rather than in their respective sidewalls 84. In yet other embodiments, the fuel pump assembly receptacle portion 136 of the pod shell 134 may be shaped differently as necessary to accommodate other fuel pump assembly 78 configurations having primary fuel pump assembly outlets located at various positions.

The fuel output channel 138 also includes an output filter receptacle shown at 148 in FIGS. 7–9 and 11. The output filter receptacle 148 is configured to house an outlet fuel filter such as the filter shown at 150 in FIG. 11, and to direct fuel from the first fuel pump assembly outlet 86 through such an outlet fuel filter 150 before allowing the fuel to exit the pump reservoir assembly through the reservoir outlet 130. The outlet filter receptacle 134 is configured to accommodate different filters as required for different applications and is large enough to accommodate large "vehicle" filters. The outlet filter receptacle cap 152 closes a complementary-shaped upper opening formed into a portion of the pod shell 134 that is molded to form the filter receptacle 134. The reservoir outlet 130 is defined by a generally cylindrical hose connector 154 that is supported on and extends axially upward from the filter receptacle cap 152. In other embodiments, the filter receptacle cap 152 may include a hole or female receptacle configured to receive a fuel supply hose leading to an engine.

The pod 132 includes an outlet check valve, shown at 156 in FIG. 9, disposed in the filter receptacle 134 between the fuel pump assembly outlet 86 and the reservoir outlet 130. The outlet check valve 156 is configured to prevent fuel from reentering the fuel pump assembly 78 and reservoir chamber 124 through the reservoir outlet 130. Prior art automotive reservoir pump assemblies include check valves disposed in outlet housings or outlet fittings. Because, according to the present invention, the outlet check valve 156 is disposed within the filter receptacle 134 rather than in an outlet housing or outlet fitting, its size is not limited by the diameter of an outlet housing or outlet fitting.

As best shown in FIG. 10, the pod shell 134 includes a separate fuel pump assembly receptacle cap 158 that closes a lower opening of the fuel pump assembly receptacle 136 to retain the fuel pump assembly 78 and the reservoir-filling device 114. The fuel pump assembly receptacle cap 158 includes a disk shaped cover portion 160 and a molded plug portion 162 disposed between the cover portion 160 and the bottom end of the fuel pump assembly 78. The plug portion 162 of the fuel pump assembly receptacle cap 158 includes the reservoir and the inlet check valve as shown in FIG. 9. As is also shown in FIG. 9, the plug portion 162 of the fuel pump assembly receptacle cap 158 also includes a cylindrical inlet filter receptacle 164 shaped to co-axially receive the complimentary-shaped cylindrical connector 166 of a pump inlet filter 168 of the pod 132. The plug 162 defines an upper chamber 170 that directs fuel flow from the inlet filter 168 to the fuel pump assembly inlet 98. The plug 162 also defines a lower chamber 172. It directs fuel flow from the inlet check valve 156 to the reservoir filling device 114.

As best shown in FIG. 10 the reservoir filling device is a jet pump 114 that is formed with the plug portion 162 of the fuel pump assembly receptacle cap 158. Also formed with the plug portion 162 of the fuel pump assembly receptacle cap 158 is a venturi input channel or inlet 110 that provides fluid communication between a second fuel pump assembly outlet 102 of the fuel pump assembly 78 and a jet venturi inlet 110. The second pump assembly outlet 102 and the venturi inlet 110 direct fuel under pressure through a venturi section 112 of the jet pump 114 which draws fuel from the lower chamber 172 propelling that fuel into the reservoir chamber 124 through an exhaust tube 174 of the jet pump 114. The incorporation of the reservoir inlet 128, the inlet check valve, the jet pump 114, and the venturi inlet 110 into a single (two-part) molded fuel pump assembly receptacle cap 158 allows certain combinations of these components to be easily selected and installed in fuel pump reservoir assemblies 120 destined for different vehicle applications. This may be done by forming or selecting caps 158 that include respective component combinations compatible with each vehicle application, then installing each of those caps 158 in a fuel delivery pod 132.

The fuel delivery pod 132 also includes a fuel pressure regulator shown at 176 in FIGS. 7–9 and 11. The fuel pressure regulator 176 is of a standard type known in the art and includes a regulator inlet 178 that is in fluid communication with the first fuel pump assembly outlet 86 through the filter receptacle 134 of the fuel pump assembly outlet 86. The fuel pressure regulator 176 also includes a regulator outlet 180 that is in fluid communication with the reservoir chamber 124. The regulator 176 is selected according to the requirements of a given application to limit reservoir assembly output pressure by metering a portion of fuel back to the reservoir chamber 124 as is well known in the art in returnless-type fuel injection system applications. The pod shell 134 is shaped to include a fuel pressure regulator receptacle 182. The fuel pressure regulator receptacle 182 may be shaped to receive any number of different fuel pressure regulators 176 as may be required to accommodate various applications. The incorporation of fuel pressure regulator receptacle 178 into the pod shell 134 eliminates the need to provide a separate regulator 176 housing.

A fuel delivery pod 132 also includes a regulator feed channel shown at 184 in FIG. 11. The regulator feed channel 184 is formed in the pod shell 134 between the filter receptacle 134 and the fuel pressure regulator inlet 178 in a position that provides fluid communication between the first fuel pump assembly outlet 86 and the fuel pressure regulator inlet 178. The incorporation of the regulator feed channel 184 into the pod shell 134 eliminates the need to provide a separate hose connecting the first fuel pump assembly outlet 86 to the fuel pressure regulator inlet 178.

According to the invention, the in-tank 122 fuel pump reservoir assembly 120 can be made by first molding the fuel delivery pod 132 from a plastic material. The fuel delivery pod 132 is molded to include the fuel pump assembly receptacle 136, the outlet filter receptacle 134, the fuel pressure regulator receptacle 178, and the various interconnecting fluid channels described above. The cover member 160 and the plug 162 of the fuel pump assembly receptacle cap 158 are molded separately from the rest of the pod shell as is the outlet filter receptacle cap. As mentioned above, a variety of different fuel pump assembly receptacle caps 158 may be formed to include components of different types and capacities as required for different fuel pump assemblies in vehicle applications. A fuel pump assembly 78, inlet filter 168, outlet filter 150, and outlet check valve 156 compatible with the desired vehicle application are then selected and installed in the pod shell 134. The outlet filter receptacle cap 152 is then installed over the outlet filter receptacle 134 and a fuel pump assembly receptacle cap 158 of appropriate configuration is then selected and installed over the opening in the fuel pump assembly receptacle 136. A fuel reservoir canister 126 compatible with the desired application is then connected over the fuel delivery pod 132 in a position to seal against the pod 132 and form a reservoir chamber 124 around the pod 132. The canister 126 may be fixed to the pod 132 by any suitable means known in the art to include the use of adhesives or seals and fasteners.

Once the intake fuel pump reservoir assembly 120 has been assembled, it may be installed in a fuel supply tank 122 by first connecting the canister 126 to a mounting plate such as the circular mounting plate shown at 186 in FIG. 8. The in-tank fuel pump reservoir assembly 120 is then lowered through an aperture formed in an upper wall of the fuel supply tank 122 and the mounting plate 186 is connected to a rim defining the aperture in the fuel supply tank 122.

Figure 14:
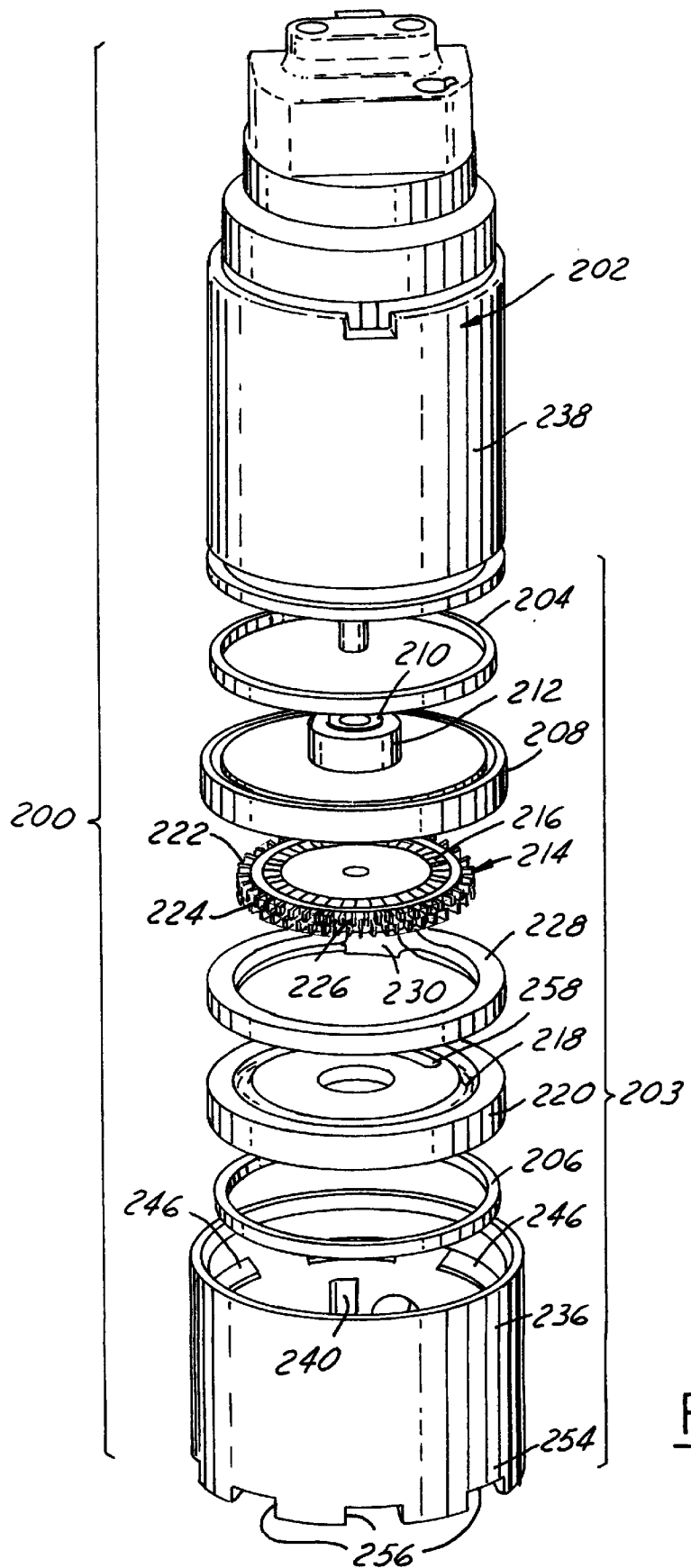
FIG. 14 is an exploded perspective view of a fourth alternate fuel pump embodiment.
Figure 22:
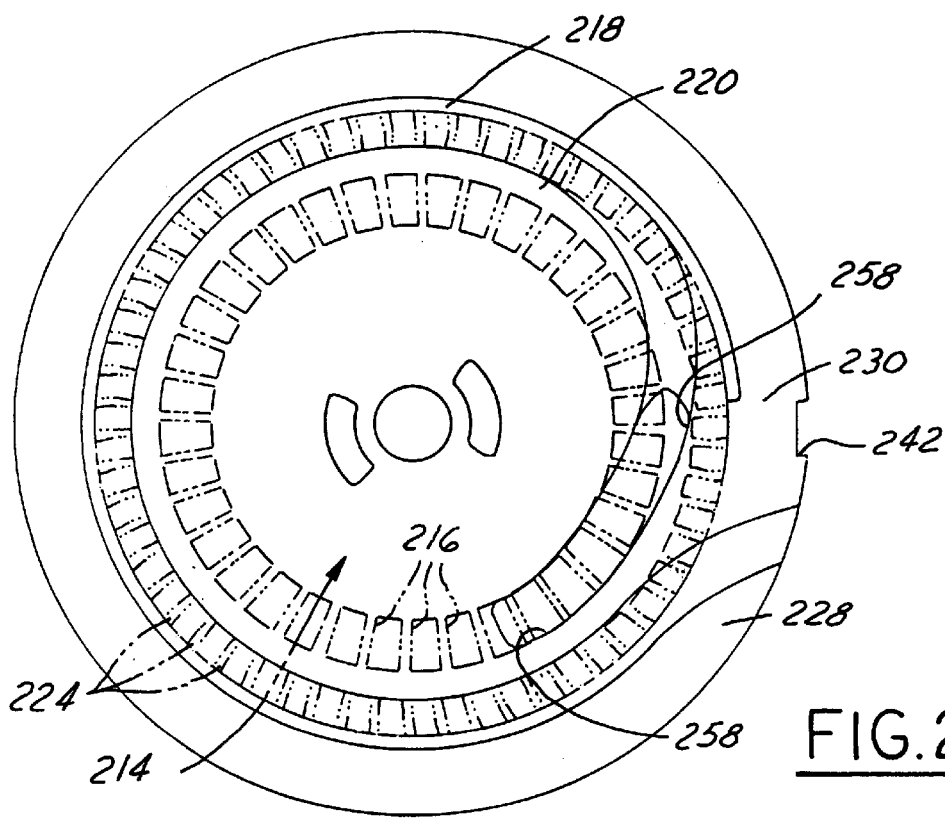
FIG. 22 is a top view of a lower cap and the guide ring of the fuel pumping mechanism of the fourth alternate fuel pump embodiment of FIG. 14 with the impeller shown in phantom.

The fifth alternate fuel pump embodiment is shown at 200 in FIGS. 14–20. As shown in FIG. 14, the fifth alternative fuel pump embodiment 200 includes an electric motor 202 (shown with outlet fittings removed) drivingly connected to a fuel pumping mechanism 203. The fuel pumping mechanism 203 includes an upper circular seal ring 204, a lower circular seal ring 206, an upper cap 208 and a lower cap 220. The lower cap 220 includes a fuel pumping mechanism inlet 258 disposed in a radially inboard region of the lower cap 220 as is best shown in FIG. 22. A graphite or bronze bushing 210 is coaxially disposed within a cylindrical axial receiver ring 212 of the upper cap 208 and around an armature shaft 252.

The armature shaft 252 drivingly connects the motor 202 to a flat, circular impeller 214 disposed between the upper and lower caps 208, 220. The impeller 214 includes an inner ring of feed ports 216 that allow a portion of fuel to pass from the inlet upward through the impeller 214 from a lower channel 218 partially defined by the lower cap 220 to an upper channel 221 partially defined by the upper cap 208. The impeller 214 also includes a set of upper vanes 222 and a set of lower vanes 224 separated from the upper vanes 222 by a thin circumferential web 226.

A guide ring 228 of generally rectangular cross-section is supported between the upper cap 208 and the lower cap 220 and surrounds the impeller 214 as is best shown in FIGS. 16–19. The guide ring 228 has thickness greater than that of the impeller 214 to establish axial clearance for the impeller 214 to turn between the upper and the lower caps 208, 220.

Figure 21:
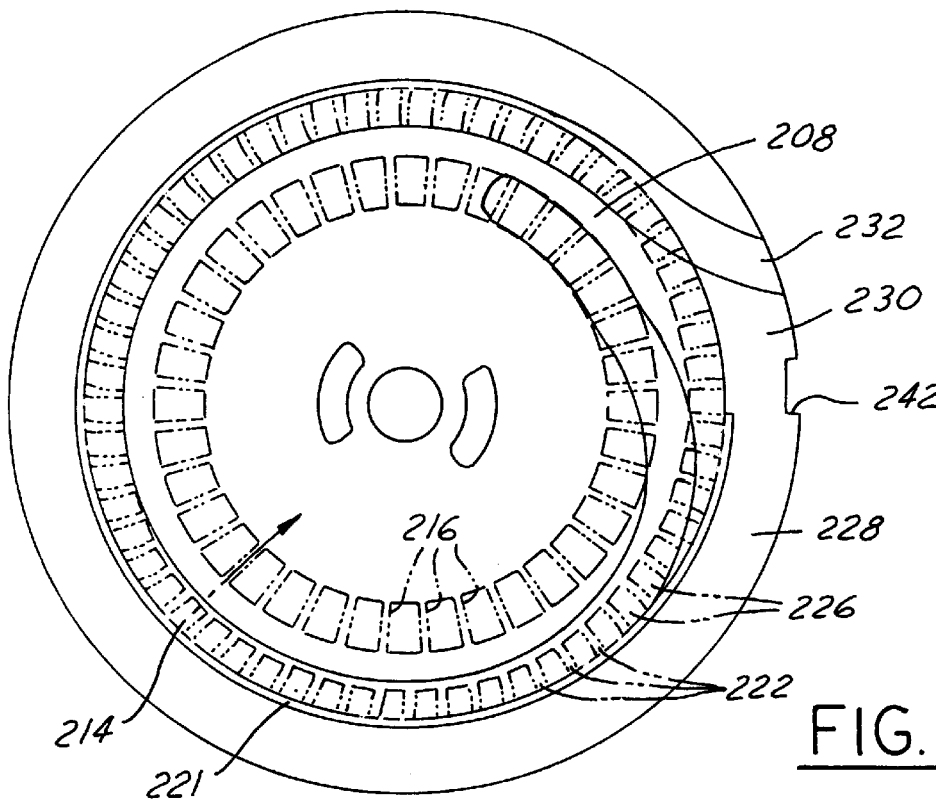
FIG. 21 is a bottom view of an upper cap and guide ring of a turbine type fuel pumping mechanism of the fourth alternate fuel pump embodiment of FIG. 14 with an impeller of the mechanism shown in phantom.

The guide ring 228 also defines an outer circumferential portion of the upper channel 221 and the lower channel 218. The guide ring 228 also includes a stripper portion 230 that prevents leakage from respective adjacent high pressure and lower pressure ends of the channels 221, 218. The guide ring 228 also defines portions of laterally-directed upper and lower exhaust ports 232, 234 for the respective upper and lower channels 221, 218 as is best shown in FIGS. 21 and 22. Interfacing surfaces of the upper and lower cap 220 and the guide ring 228 are lapped to provide a hermetic seal between those surfaces. In other embodiments, the interfacing surfaces of the upper and lower caps 208, 220 and the guide ring 228 may be formed to these tolerances by other means known in the art.

As shown in FIGS. 16–20, a generally cylindrical pumping mechanism housing 236 is coaxially disposed around the upper and lower caps 208, 220, the guide ring 228 and the impeller 214 as well as a lower axial end portion of a flux tube 238 of the electric motor 202. As shown in FIG. 14, the housing 236 includes a rectangular, radially inwardly protruding integral key 240 configured to engage respective complimentary-shaped notches in the upper and lower caps 208, 220 as well as the guide ring 228. The guide ring notch is shown at 242 in FIGS. 21 and 22. The key 240 and notches are configured and positioned to establish a proper angular position of the upper and lower caps 208, 220 in the guide ring 228 relative to each other and to the housing 236.

The pumping mechanism housing 236 also includes a radially inwardly extending circumferential flange 244 that supports the lower cap 220 and is in sealing engagement with the lower seal ring 206 as shown in FIGS. 16–18 and 20. Similarly, the upper seal ring 204 is in sealing engagement between the upper cap 208 and an axial lower end of the flux tube 238 of the motor 202.

The housing 236 also includes a plurality of radially inwardly extending snap detents 246 configured to engage one or more complementary recesses 247 formed in an outer circumferential surface of the flux tube 238 as shown in FIGS. 16–18 and 20. Other embodiments may include other suitable retaining structures known in the art. The distance between the lower circumferential flange 242 and the snap detents 246 is small enough to compress the lower seals between the caps 208,220 and the guide ring 228 and to hold the upper and lower caps 208, 220 and guide ring 228 in compression. The distance is also great enough to insure that axial compressive forces are applied by the seal rings 204, 206 onto the upper and lower caps 208, 220 rather than by the rigid flux tube 238 and/or the lower circumferential flange.

While the housing 236 shown in FIGS. 14, 16 and 17 is shown as a separate unit, the housing 236 may instead be formed as a single integral or unitary piece with a surrounding/supporting structure such as a pod shell 134 or a reservoir as shown in FIG. 18.

Figure 19:
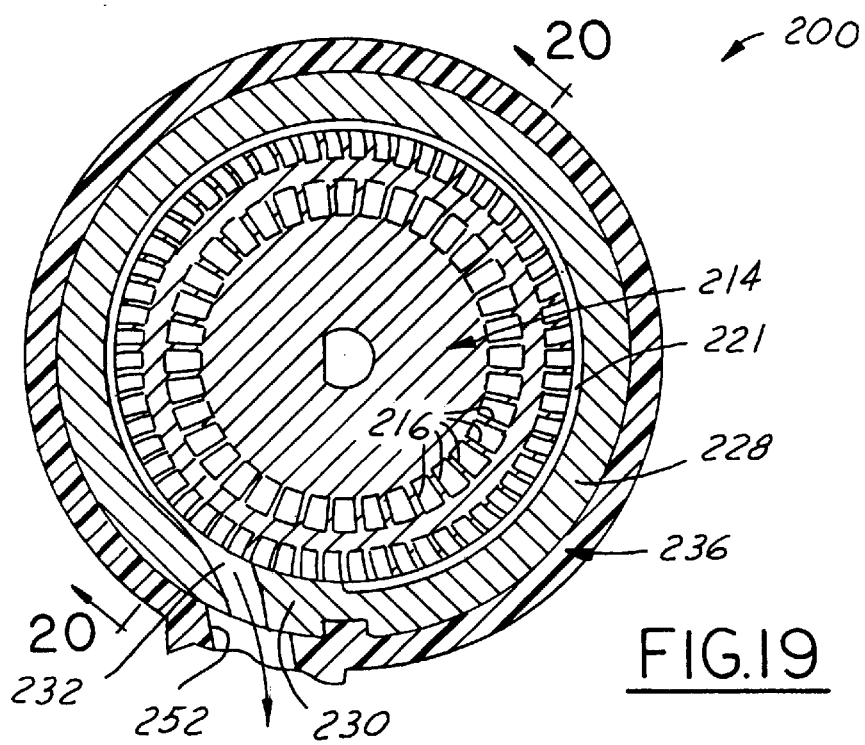
FIG. 19 is a cross-sectional view of the fourth alternate fuel pump embodiment of FIG. 14 taken along line 19—19 of FIG. 17.
Figure 20:
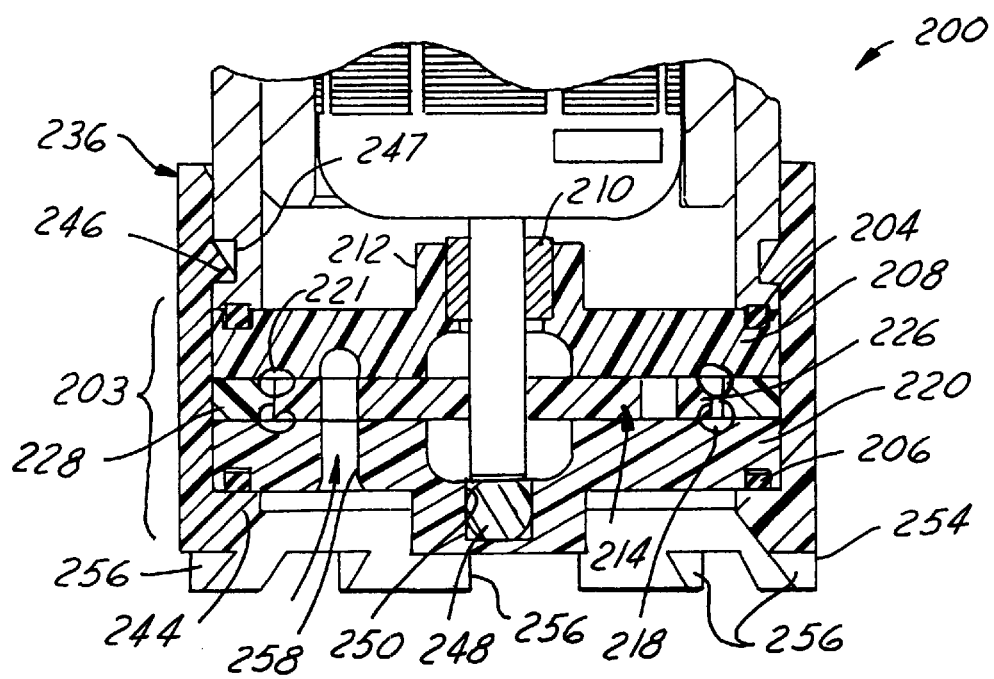
FIG. 20 is a fragmentary cross-sectional view of the fourth alternate fuel pump embodiment of FIG. 14 taken along line 20—20 of FIG. 19.

A steel ball bearing 248 is disposed in a recess 250 formed in the lower cap 220 either by molding or by drilling. The bearing 248 provides a thrust-bearing surface for a lower axial end of the armature shaft 252 of the motor 202. The housing 236 also includes a fuel pump assembly outlet 252 as shown in FIG. 19 positioned to expose the upper and lower exhaust ports 232, 234.

The upper and lower caps 208, 220, the guide ring 228 and the impeller 214 are formed from polyphenylene sulfide (PPS). In other embodiments, other suitable materials known in the art may be used to form these components. The housing 236 is made of an acetal but may be made of any other suitable material in other embodiments. The housing 236 also includes an integral base ring 254 that includes plurality of circumferentially disposed and radially directed channels 256 to allow fuel to be drawn into the fuel pump assembly inlet when the base ring 254 is disposed on the floor of a fuel tank 122, reservoir or similar structure.

As best shown in FIG. 22 the fuel pumping mechanism inlet 258 is disposed in a radially inboard position to allow respective portions of the upper and lower channels 221, 218 leading from the inlet 258 to spiral radially outward from a position aligned with the feed ports 216 of the impeller 214 to a circumferential position aligned with and leading into engagement with the respective upper and lower vanes 222, 224 of the impeller 214. This allows the entering fuel to engage the impeller vanes 222, 224 at a point most radially inboard, i.e., at a "root" portion of each impeller vein. This is believed to improve the efficiency of the impeller 214 by complementing rather than opposing helical flow patterns that characteristically form in fluid flowing circumferentially through a regenerative turbine pump.

Figure 23:
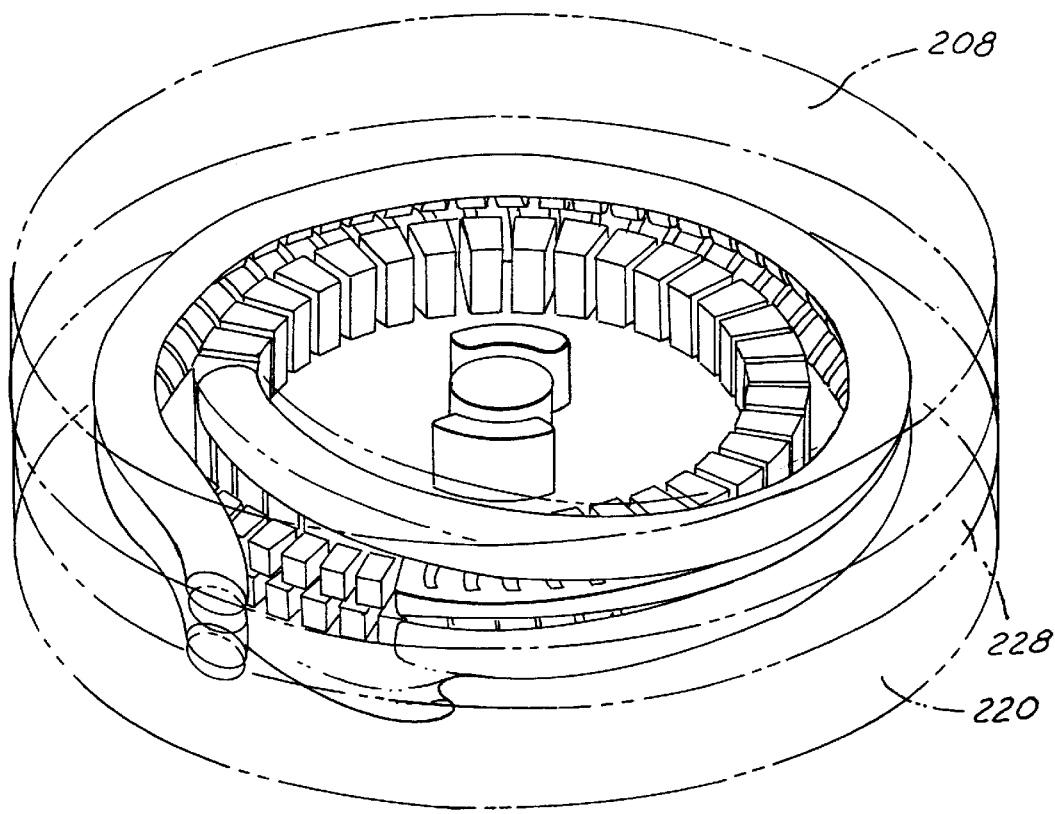
FIG. 23 is a perspective view of a fluid model of fuel moving through the fuel pumping mechanism of the fourth alternate fuel pump embodiment which is shown in phantom.
Figure 24:
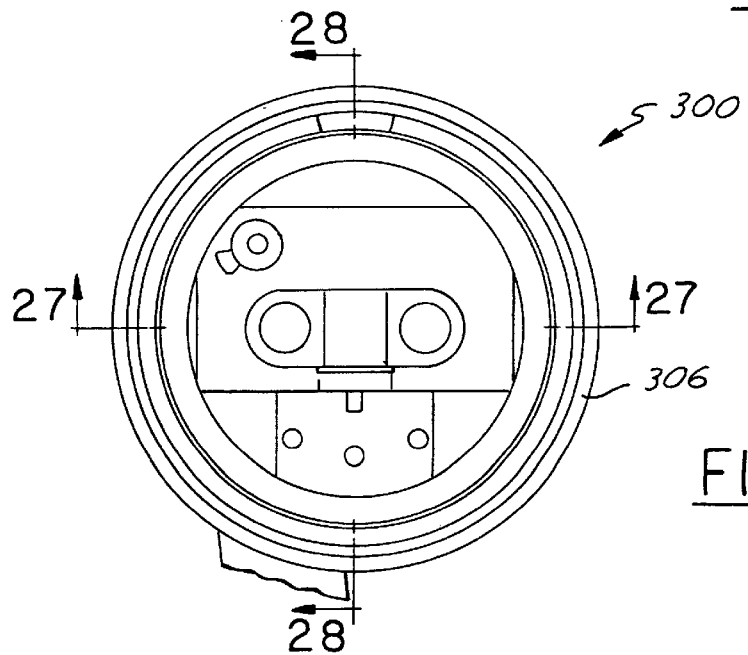
FIG. 24 is a top view of a fifth alternate fuel pump embodiment.

As shown in FIGS. 21, 22 and 23, fuel flows upward from the fuel pumping mechanism inlet 258 into the upper cap 208 through the feed ports 216 in the impeller 214. The fuel is then propelled along the upper and lower channels 221, 218 initially impacting the respective upper and lower impeller vanes 222, 224 at their roots. The fuel flow pattern of fuel passing through the fuel pumping mechanism 203 in relation to the upper and lower impeller vanes 222, 224 is best shown with reference to the fluid model of FIG.23.

Figure 25:
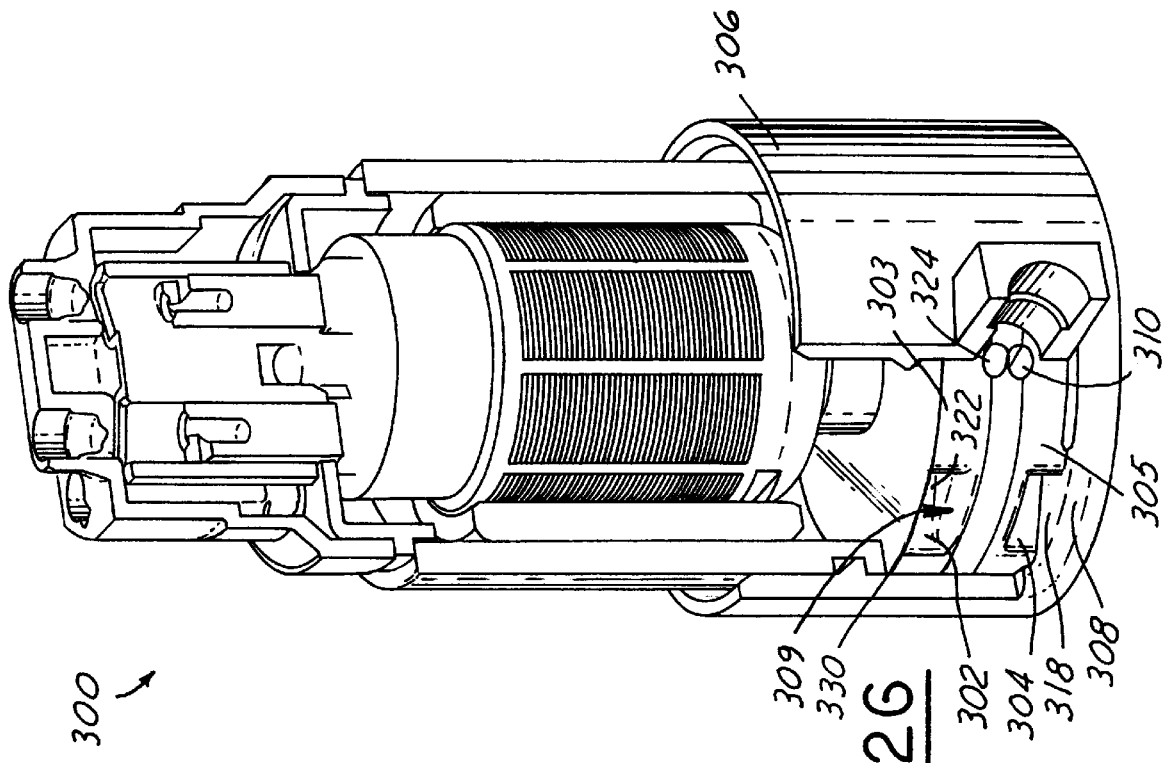
FIG. 25 is a diagrammatic perspective view of the fifth alternate fuel pump embodiment of FIG. 24.
Figure 26:
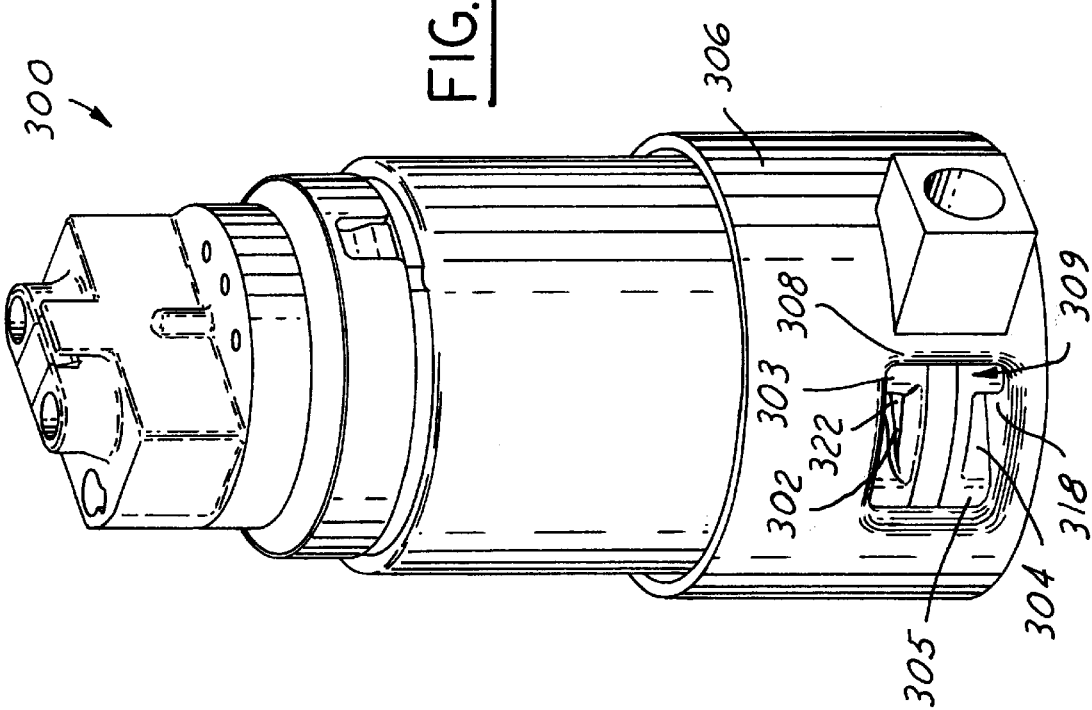
FIG. 26 is a cut-away diagrammatic perspective view of the fifth alternate fuel pump embodiment of FIG. 24.
Figure 27:
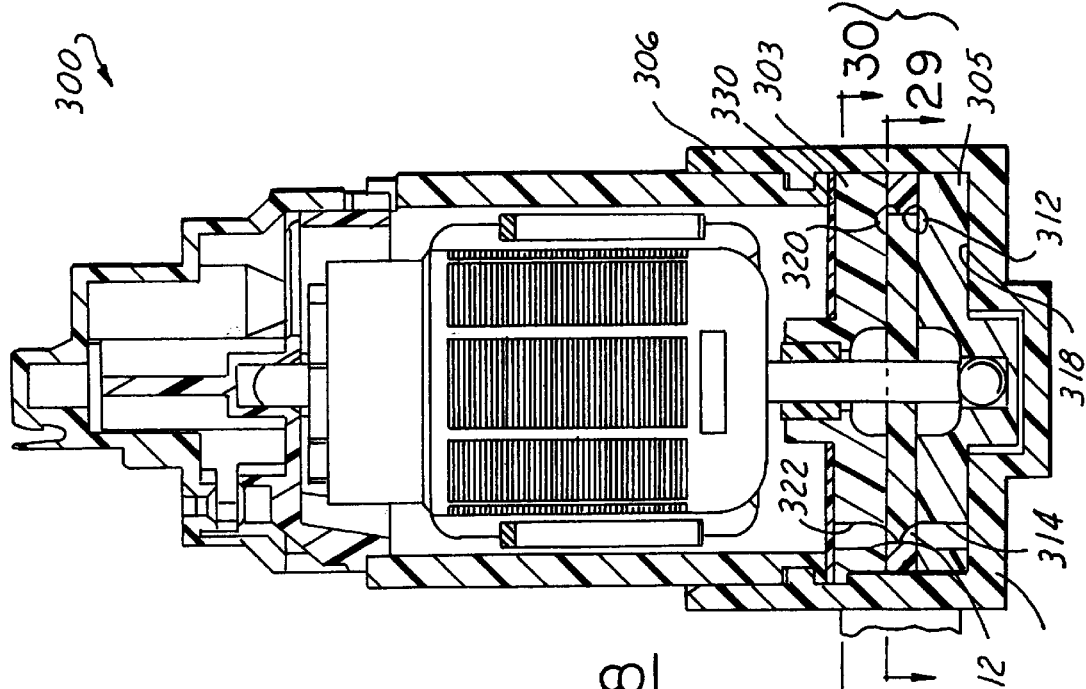
FIG. 27 is a partial cross-sectional view of the fifth alternate fuel pump embodiment of FIG. 24 taken along line 27—27 of FIG. 24.
Figure 28:
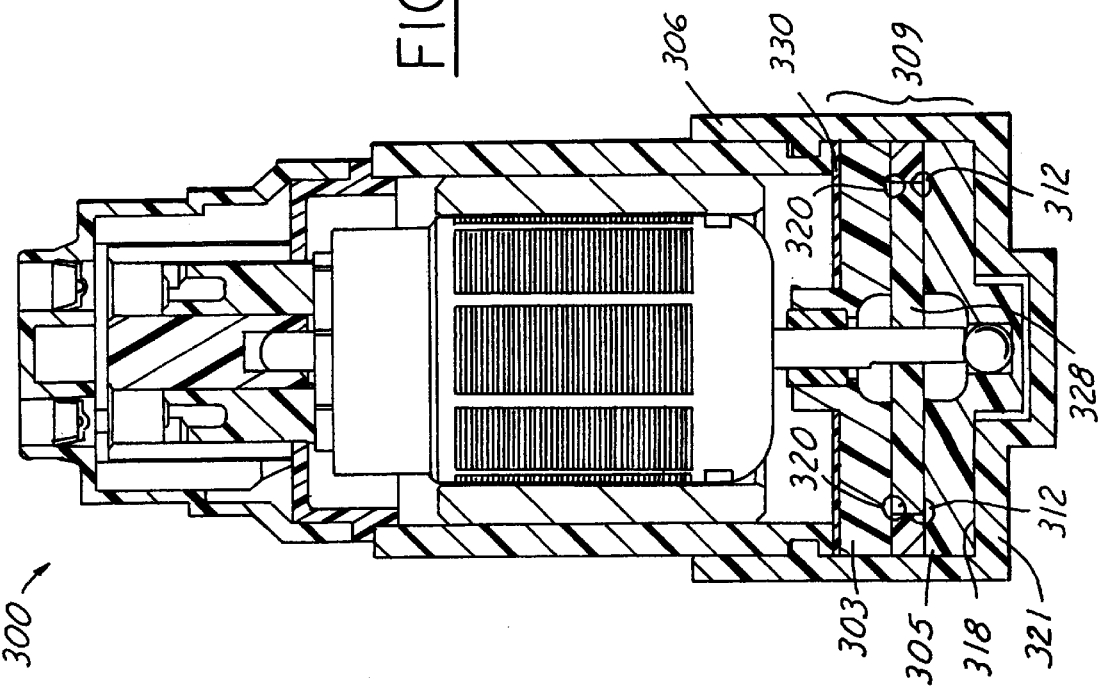
FIG. 28 is a partial cross-sectional view of the fifth alternate fuel pump embodiment of FIG. 24 taken along line 28—28 of FIG. 24.
Figure 29:
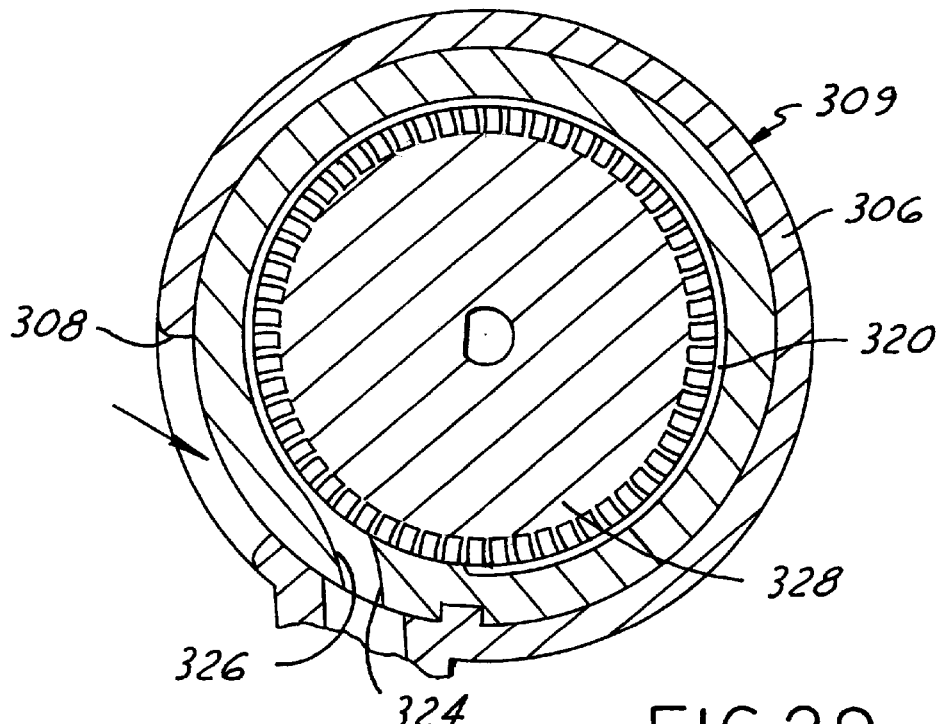
FIG. 29 is a cross-sectional view of the fifth alternate fuel pump embodiment of FIG. 24 taken along line 29—29 of FIG. 28.
Figure 30:
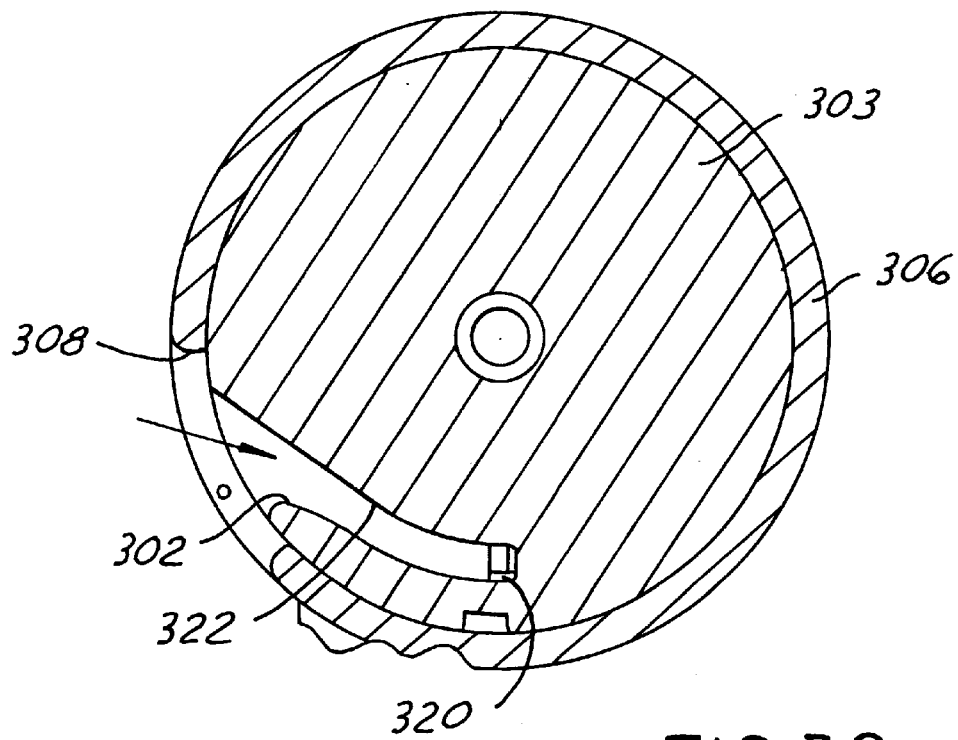
FIG. 30 is a cross-sectional view of the fifth alternate fuel pump embodiment of FIG. 24 taken along line 30—30 of FIG. 28.
Figure 31:
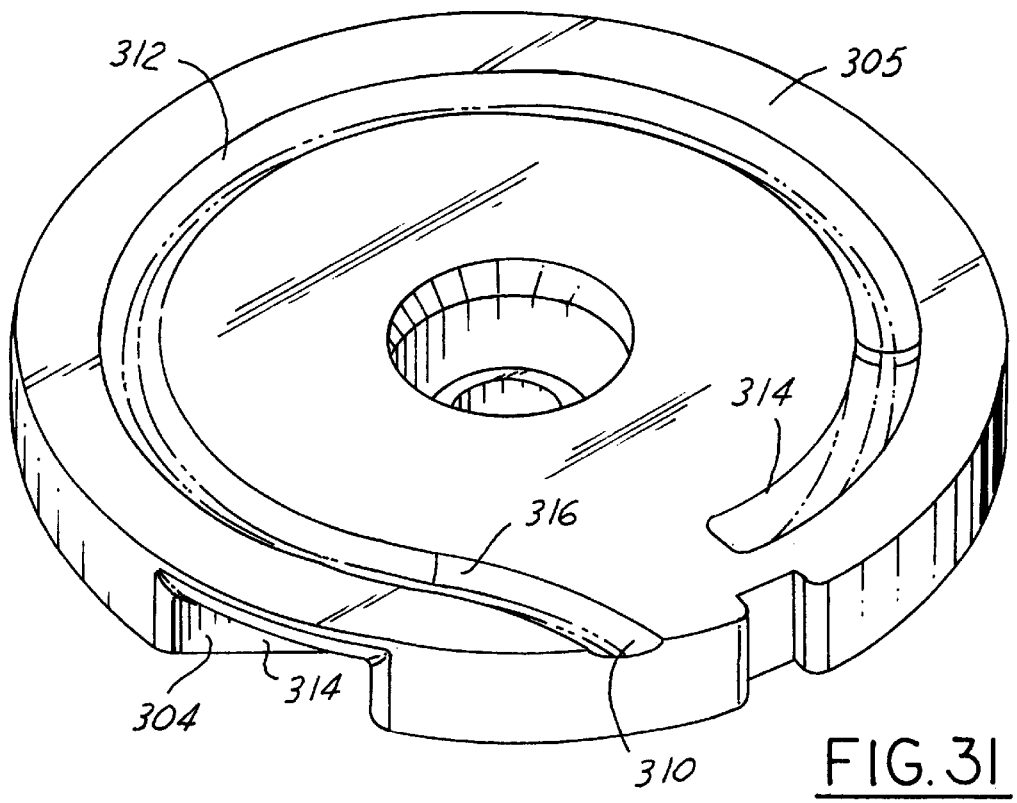
FIG. 31 is a perspective view of a lower cap of a fuel pumping mechanism of the fifth alternate fuel pump embodiment of FIG. 24.
Figure 32:
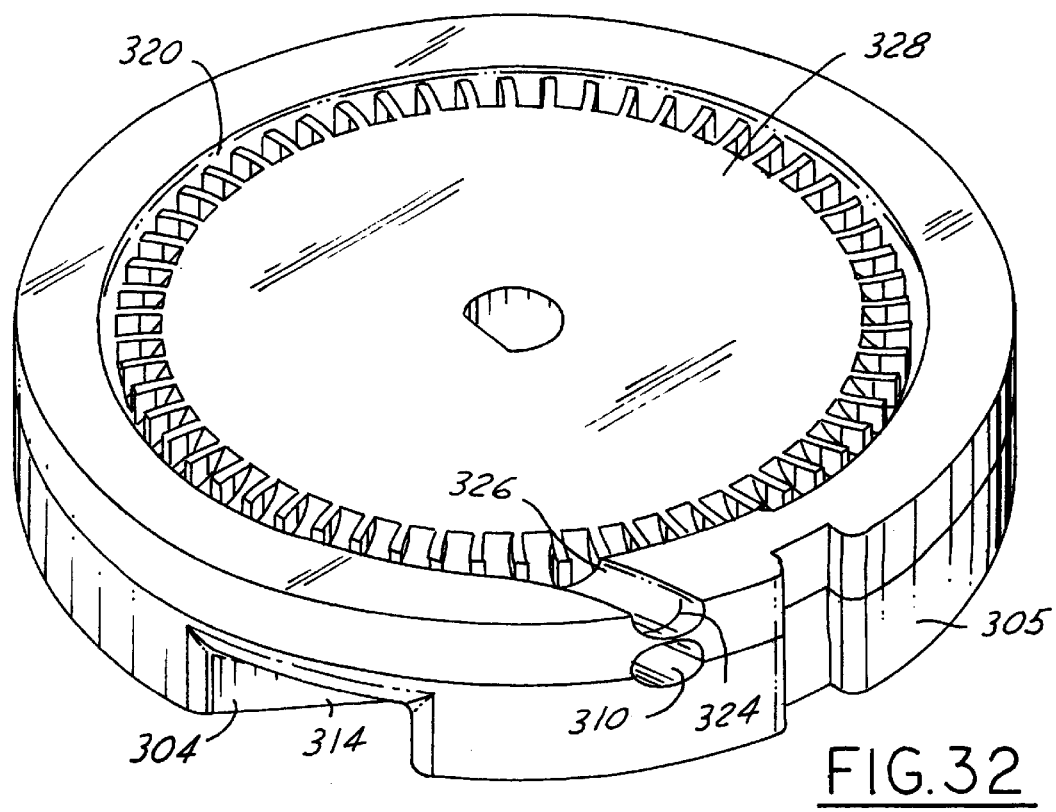
FIG. 32 is a perspective view of the lower cap, guide ring and impeller of the fuel pumping mechanism of the fifth alternate fuel pump embodiment.
Figure 33:
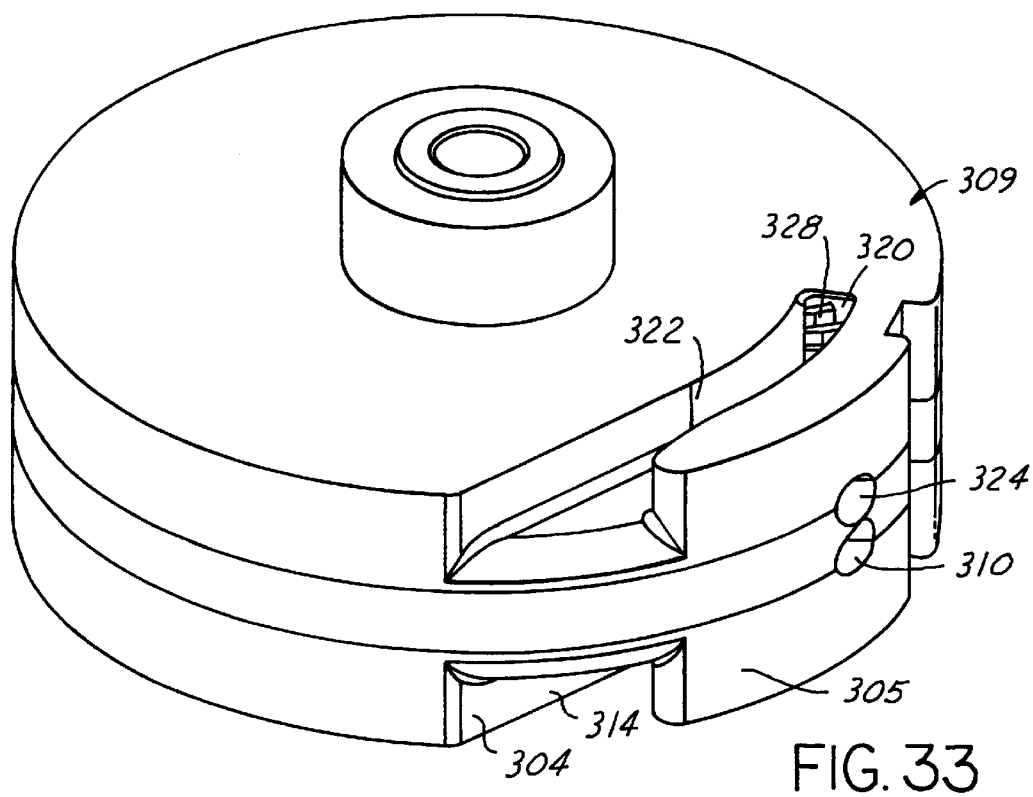
FIG. 33 is a perspective view of the fuel pumping mechanism of the fifth alternate fuel pump embodiment of FIG. 24 with a cover plate of the mechanism partially cut-away to reveal to reveal an inlet transition portion of the upper channel and a portion of the impeller.

As shown in FIGS. 25, 30, the sixth alternative fuel pump assembly embodiment 300 includes upper and lower side inlets 302, 304 defined primarily by upper and lower caps 303, 305, respectively, of a fuel pumping mechanism 309 of the assembly 300. A fuel pumping mechanism retainer sleeve 306 of the assembly 300 includes a side inlet window 308 aligned with and exposing the side inlets 302, 304 to allow fuel to be drawn into the fuel pumping mechanism 309 from the side of the assembly 300 rather than from the lower axial end as in the above embodiments.

As shown in FIGS. 31–34, the lower side inlet 304 feeds into a semi-circular lower channel 312 via a lower inlet transition portion or inlet passage 314 that crosses under a lower exhaust transition portion or exit passage 316 leading to a lower exhaust port 310 of the lower channel 312. The lower channel 312 is, apart from transition portions 314, 316, of constant radius. (In other embodiments the lower channel 312 may be formed to have other then a constant radius.)

As best shown in FIGS. 29, 30, 33 and 34, the upper side inlet 302 feeds into a semi-circular upper channel 320 via an upper inlet transition portion or inlet passage 322 that crosses over an upper exhaust transition portion or exit passage 326 leading to an upper exhaust port 324 of the upper channel 320. The upper channel 320 is, apart from the transition portions 322, 326, of constant radius. (In other embodiments the upper channel 320 may be formed to have other then a constant radius.)

The crossing of the channel intake and exhaust transition portions 322, 326; 314, 316 allows the side inlets 302, 304 to merge into their respective channels 320, 312 in a more tangential, less radial orientation to reduce efficiency losses associated with forcing fuel to make sudden direction changes while flowing through the fuel pumping mechanism 309. The crossing of the transition portions 322, 326; 314, 316 also allows the channels 320, 312 to merge with their respective exhaust ports 324, 310 in a more tangential, less radial orientation to effect a similar reduction in efficiency losses.

The crossing of the transition portions 322, 326; 314, 316 also significantly increases the overall length of the channels 320, 312 thereby increasing the amount of kinetic energy imparted to the fluid by an impeller 328 of the fuel pumping mechanism 309. The amount of energy imparted increases because impeller vanes of the impeller 328 are in contact with a given fluid mass for a greater period of time during each impeller revolution.

The crossing of the channel transition portions 322, 326; 314, 316 also allows direction changes forced on fluid passing through the channel transition portions 322, 326; 314, 316 to be more gradual, further reducing energy losses.

A floor 318 of the lower side inlet 304 and the lower inlet transition portion 314 of the lower channel 312 is defined by a floor 320 of the pumping mechanism housing. An annular cover plate 330 is disposed on an upper surface of the upper cap to close the upper side inlet 302 and inlet transition portion 322 of the upper channel 320.

Figure 34:
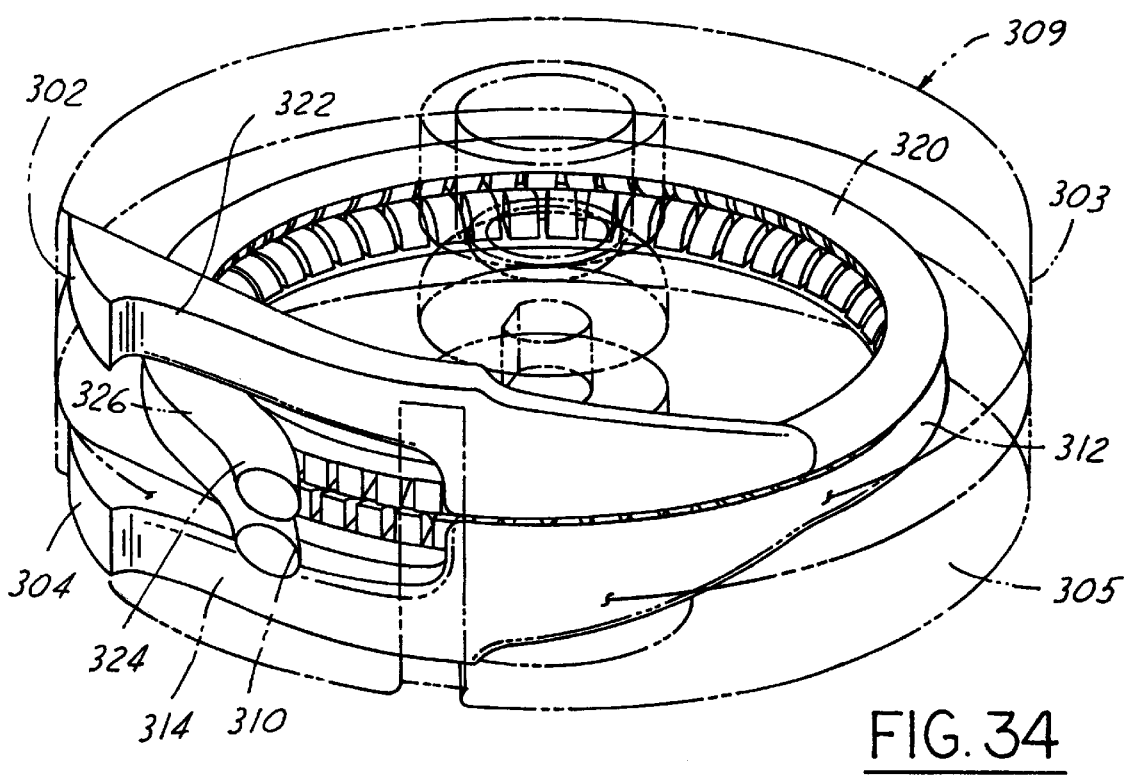
FIG. 34 is a fluid model of the flow pattern of fuel through the upper and lower channels of the fuel pumping mechanism with the fuel pumping mechanism shown in phantom.
Figure 35:
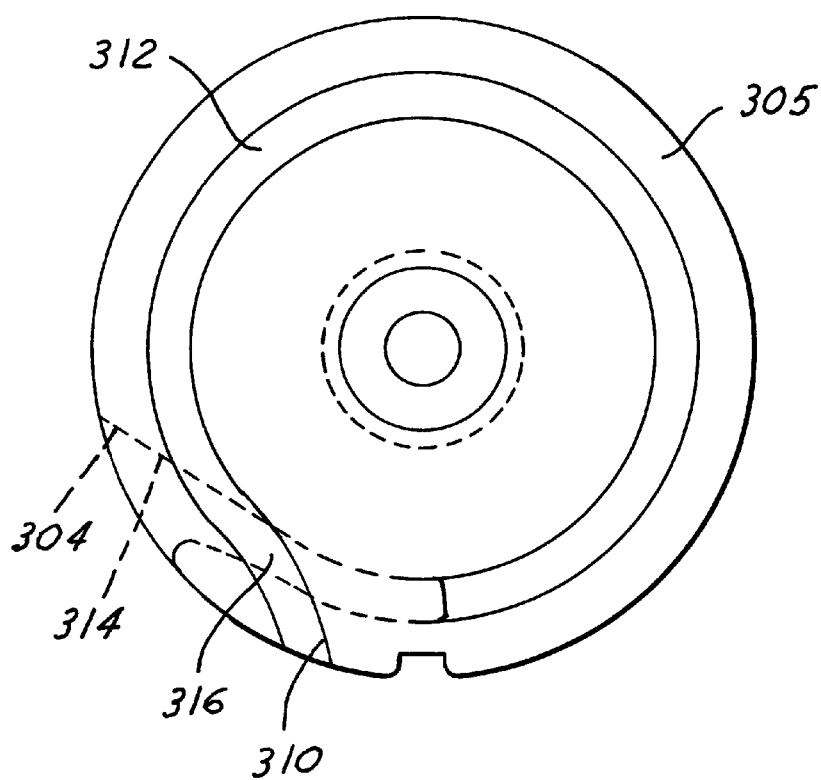
FIG. 35 is a schematic top view of the lower channel of the fuel pumping mechanism.

The resulting fuel flow pattern through the upper and lower channels 320, 312 is best shown in a fluid model of that flow pattern shown in FIG. 34.

While the above embodiments are described and shown as including turbine-type fuel pumps, other embodiments may include any suitable type of fuel pump known in the art to include gerotor pumps.

This description is intended to illustrate certain embodiments of the invention rather than limit the invention. Therefore, descriptive rather then limiting words are used. Obviously, it's possible to modify this invention from what the description teaches. Within the scope of the claims, one may practice the invention other than what's described.

What is claimed is:

1. A fuel pump comprising;
   a housing having an inlet through which fuel is drawn and an outlet through which fuel is discharged under pressure;
   a motor chamber defined by the housing;
   a motor carried by the housing and having a rotating element disposed within the motor chamber;
   a fuel pumping mechanism carried by the housing and driven by the motor to draw fuel into an inlet of the fuel pumping mechanism and discharge fuel under pressure through an outlet from the fuel pumping mechanism;
   a fuel passage separate from the motor chamber communicating the outlet of the fuel pumping mechanism with the outlet of the housing whereby the pressure within the motor chamber is less than the pressure of fuel discharged from the fuel pumping mechanism to reduce the resistance to rotation of the rotating element of the motor.

2. The fuel pump of claim 1 wherein the motor is electrically powered and has a rotor received in the fuel pump motor chamber, a permanent magnet stator around the rotor and a flux tube adjacent the stator.

3. A fuel pump comprising:
   a housing having an outer shell, an inlet through which fuel is drawn and an outlet through which fuel is discharged under pressure;
   a motor chamber defined by the housing;
   an electrically powered motor carried by the housing and having a rotor received in the motor chamber and a permanent magnet stator around the rotor and a flux tube adjacent the stator;
   a fuel pumping mechanism carried by the housing and driven by the motor to draw fuel into an inlet of the fuel pumping mechanism and discharge fuel under pressure through an outlet from the fuel pumping mechanism;

a fuel passage separate from the motor chamber communicating the outlet of the fuel pumping mechanism with the outlet of the housing whereby the pressure within the motor chamber is less than the pressure of fuel discharged from the fuel pumping mechanism to reduce the resistance to rotation of the rotating element of the motor;

the fuel passage being defined between the outer shell and the flux tube.

4. The fuel pump of claim 1 which also comprises a vent opening in the housing which permits fluid to escape from the motor chamber.

5. The fuel pump of claim 1 which also comprises an outlet port plate carried by the housing and having a passage formed therethrough communicating the outlet of the fuel pumping mechanism with the fuel passage.

6. The fuel pump of claim 1 wherein the fuel pumping mechanism has an impeller driven for rotation by the motor.

7. The fuel pump of claim 5 which also comprises a vent port formed through the outlet port plate and communicating fluid in the fuel pumping mechanism between the inlet and outlet of the fuel pumping mechanism with the motor chamber.

8. The fuel pump of claim 4 wherein fuel leakage from the fuel pumping mechanism enters the motor chamber and is removed from the motor chamber through the vent opening.

9. The fuel pump of claim 3 which also comprises an outer shell of the housing and the fuel passage is formed completely in a portion of the outer shell that defines the motor chamber.

10. The fuel pump of claim 1 wherein the fuel passage extends through a side wall of the outer shell that defines the motor chamber.

11. The fuel pump of claim 7 wherein the fuel pumping mechanism has a fuel pumping channel extending between the inlet and the outlet of the fuel pumping mechanism and the vent port communicates with the fuel pumping channel between the inlet and the outlet of the fuel pumping mechanism.

12. The fuel pump of claim 11 wherein the vent port communicates with the fuel pumping channel closer to the inlet of the fuel pumping mechanism than the outlet of the fuel pumping mechanism.

13. The fuel pump of claim 1 wherein the pressure in the motor chamber is less than 50% of the pressure of the fuel discharged from the fuel pumping mechanism.

14. The fuel pump of claim 1 wherein the rotating element is a rotor.

15. The fuel pump of claim 1 wherein:
the fuel pump includes a side wall spaced radially from and disposed generally parallel to a rotational axis of the rotating element of the electric motor; and
the housing inlet is disposed in the side wall and is configured to draw fuel into the fuel pump in a direction generally perpendicular to the rotational axis of the rotating element.

16. The fuel pump of claim 1 wherein:
the fuel pump includes a side wall spaced radially from and disposed generally parallel to a rotational axis of the rotating element of the electric motor; and
the housing outlet is disposed in the side wall and is configured to exhaust fuel from the fuel pump in a direction generally perpendicular to the rotational axis of the rotating element.

17. An in-tank fuel pump reservoir assembly for drawing fuel from a fuel supply tank and discharging the fuel under pressure to an engine, the assembly comprising:
a reservoir chamber partially defined by a fuel reservoir canister, the canister being configured for mounting within a fuel supply tank;
a reservoir inlet disposed and configured to provide fluid communication between the fuel supply tank and the reservoir chamber;
a reservoir outlet disposed and configured to provide fluid communication between the reservoir chamber and an engine;
a reservoir filling device disposed between the reservoir inlet and the reservoir chamber and configured to draw fuel into the reservoir chamber from the fuel supply tank through the reservoir inlet;
a fuel pump assembly disposed within the canister and configured to draw fuel from the reservoir chamber and to discharge at least a portion of that fuel to the engine through the reservoir outlet; and
a fuel delivery pod comprising the fuel pump assembly, the reservoir filling device, and the inlet check valve, the pod being connectable to the canister to cooperatively define the reservoir chamber whereby the assembly is readily adaptable to multiple fuel tank applications by forming or selecting respective canisters that are compatible with each such application.

18. An in-tank fuel pump reservoir assembly as defined in claim 17 in which the pod comprises a pod shell including a fuel pump assembly receptacle configured to receive the fuel pump assembly.

19. An in-tank fuel pump reservoir assembly as defined in claim 18 in which the fuel pump assembly receptacle of the pod shell is configured to accommodate different fuel pump assemblies.

20. An in-tank fuel pump reservoir assembly as defined in claim 18 in which the pod includes a fuel output channel formed in the pod shell and providing fluid communication between the first fuel pump assembly outlet and the reservoir outlet.

21. An in-tank fuel pump reservoir assembly as defined in claim 20 in which:
the first fuel pump assembly outlet extends through a side wall of the fuel pump assembly; and
the fuel output channel includes a collection chamber defined by and disposed between the fuel pump assembly receptacle and the side wall of the pump in a position to collect and direct fuel discharged from the first fuel pump assembly outlet.

22. An in-tank fuel pump reservoir assembly as defined in claim 21 in which the fuel output channel includes a filter receptacle configured to house an outlet fuel filter and to direct fuel from the first fuel pump assembly outlet through the outlet fuel filter before allowing the fuel to exit the reservoir through the reservoir outlet.

23. An in-tank fuel pump reservoir assembly as defined in claim 22 in which the filter receptacle is configured to accommodate different fuel filters.

24. An in-tank fuel pump reservoir assembly as defined in claim 22 in which the pod:
includes an outlet check valve disposed in the filter receptacle between the fuel pump assembly outlet and the reservoir outlet; and
is configured to prevent fuel from re-entering the fuel pump assembly and reservoir chamber through the reservoir outlet.

25. An in-tank fuel pump reservoir assembly as defined in claim 18 in which:
    the reservoir filling device is a jet pump;
    the pod shell includes the jet pump; and
    the pod shell also includes a venturi input channel providing fluid communication between a second fuel pump assembly outlet of the fuel pump assembly and a jet pump venturi inlet.

26. An in-tank fuel pump reservoir assembly as defined in claim 25 in which the pod shell includes a fuel pump assembly receptacle cap configured to close a lower opening of the fuel pump assembly receptacle, the pump receptacle cap comprising the reservoir inlet, the inlet check valve, the jet pump, and the venturi input channel.

27. An in-tank fuel pump reservoir assembly as defined in claim 17 in which the pod comprises a fuel pressure regulator having a regulator inlet in fluid communication with the first fuel pump assembly outlet and a regulator outlet in fluid communication with the reservoir chamber, the regulator being configured to limit reservoir assembly output pressure by metering a portion of fuel back to the reservoir chamber.

28. An in-tank fuel pump reservoir assembly as defined in claim 27 in which the pod includes a regulator feed channel formed in the pod shell and providing fluid communication between the first fuel pump assembly outlet and the fuel pressure regulator.

29. An in-tank fuel pump reservoir assembly for drawing fuel from a fuel supply tank and discharging the fuel under pressure to an engine, the assembly comprising:
    a pump housing defining a motor chamber and including a housing outlet;
    an electric motor disposed within the motor chamber and including a rotating element; a fuel pumping mechanism disposed in the housing and driven by the motor, the fuel pumping mechanism configured to draw fuel in through a pump inlet and to discharge the fuel at high pressure through a first pump exhaust; and
    a fuel passage communicating the first pump exhaust with the housing outlet and configured to allow high pressure fuel to bypass the motor while moving from the first pump exhaust to the housing outlet.

30. An in-tank fuel pump reservoir assembly as defined in claim 29 in which:
    the assembly includes a side wall spaced radially from and disposed generally parallel to a rotational axis of the rotating element of the electric motor; and
    the housing outlet is disposed in the side wall of the pump housing.

31. An in-tank fuel pump reservoir assembly as defined in claim 29 in which:
    the assembly includes a side wall spaced radially from and disposed generally parallel to a rotational axis of the rotating element of the electric motor; and
    the housing inlet is disposed in the side wall.

32. An in-tank fuel pump reservoir assembly as defined in claim 30 in which the housing outlet includes a plurality of apertures in the side wall of the pump housing.

33. An in-tank fuel pump reservoir assembly as defined in claim 29 in which the pump housing is a flux tube.

34. An in-tank fuel pump reservoir assembly as defined in claim 29 in which the fuel pumping mechanism includes a second pump exhaust configured to discharge fuel under pressure through the venturi section of a jet pump.

35. A method for making an in-tank fuel pump reservoir that includes a reservoir chamber, a reservoir inlet configured to provide fluid communication between a fuel supply tank and the reservoir chamber, a reservoir outlet configured to provide fluid communication between the reservoir chamber and an engine, a reservoir filling device configured to draw fuel into the reservoir chamber from the fuel supply tank through the reservoir inlet, and a fuel pump assembly configured to draw fuel from the reservoir chamber and to discharge at least a portion of that fuel to the engine through the reservoir outlet; the method including the steps of:
    providing a modular fuel delivery pod comprising the fuel pump assembly, the reservoir filling device, and the inlet check valve;
    providing a fuel reservoir canister and;
    connecting the fuel reservoir canister to the fuel delivery pod such that the canister and pod cooperatively form the reservoir chamber.

36. The method of claim 35 in which the step of providing the fuel delivery pod includes molding a pod shell portion of the fuel delivery pod.

37. The method of claim 35 in which the step of providing the fuel delivery pod includes:
    selecting a fuel pump assembly compatible with an intended vehicle fuel tank application; and
    installing the fuel pump assembly in a fuel pump assembly receptacle portion of the fuel delivery pod shell.

38. The method of claim 35 in which the step of providing the fuel reservoir canister includes providing a canister compatible with an intended vehicle fuel tank application.

39. A fuel pump comprising;
    a fuel pump housing having an inlet through which fuel is drawn and an outlet through which fuel is discharged under pressure;
    a motor carried by the fuel pump housing;
    a fuel pumping mechanism carried by the fuel pump housing and driven by the motor to draw fuel into the fuel pump through the fuel pump inlet and to discharge fuel under pressure through the fuel pump outlet, the fuel pumping mechanism including:
        a pumping mechanism housing including inlet and exhaust ports that communicate with the fuel pump inlet and outlet, respectively;
        an impeller rotatably supported within an impeller cavity formed in the pumping mechanism housing and rotatably driven by the motor, the impeller including axially upper and lower impeller vanes spaced around an outer circumferential periphery of the impeller;
        a generally semi-circular pumping channel formed in the pumping mechanism housing around a circular periphery of the impeller cavity, the impeller vanes being configured and positioned to move fluid through the pumping channel as the impeller rotates within the impeller cavity;
        a pumping channel inlet passage formed in the pumping mechanism housing and connecting the inlet port to an inlet end of the pumping channel; and
        the pumping channel inlet passage configured to direct entering fuel toward respective roots of the impeller vanes to improve impeller efficiency by complementing helical flow patterns that characteristically form in fluid flowing circumferentially through a pumping mechanism of this type.

40. A fuel pump as defined in claim 39 in which:
    the fuel pumping mechanism inlet port is disposed in an axial surface of the pumping mechanism housing in a position spaced radially inboard from the impeller vanes; and the pumping channel inlet passage spirals radially outward from the inlet port to the inlet end of the pumping channel.

41. A fuel pump as defined in claim 39 in which:
the semi-circular pumping channel includes upper and lower channel portions formed into respective upper and lower impeller cavity walls;
the upper and lower impeller vanes are configured and positioned to move fluid through the upper and lower channel portions, respectively;
the pumping channel inlet passage includes axially-spaced upper and lower inlet passages formed into the upper and lower impeller cavity walls and communicating with the upper and lower channel portions, respectively;
the impeller includes a circular array of feed ports axially aligned with and allowing fluid to flow from the lower into the upper inlet passage portion;
the fuel pumping mechanism inlet is disposed in a position spaced radially inboard from the impeller vanes; and
the upper and lower inlet passages spiral radially inward from the fuel pumping mechanism inlet to a position aligned with the feed ports of the impeller, directing entering fuel into engagement with the roots of the respective upper and lower vanes of the impeller.

42. A fuel pump as defined in claim 41 in which:
the pumping mechanism exhaust port includes axially-spaced upper and lower exhaust ports formed in a circumferential sidewall of the pumping mechanism housing; and
axially-spaced upper and lower pumping channel exit passages are formed in the pumping mechanism housing and connect the respective upper and lower pumping channels to the upper and lower exhaust ports, respectively.

43. A fuel pump as defined in claim 41 in which the fuel pumping mechanism housing includes a stripper portion disposed between outlet and inlet ends of the pumping channel and configured to limit leakage of higher pressure fluid from the outlet end of the pumping channel into the inlet end of the pumping channel.

44. A fuel pump as defined in claim 39 in which a generally cylindrical pumping mechanism retainer sleeve is coaxially disposed around the fuel pumping mechanism and is configured to hold pumping mechanism components together.

45. A fuel pump as defined in claim 44 in which the retainer sleeve extends integrally from a supporting structure.

46. A fuel pump as defined in claim 44 in which the retainer sleeve comprises an integral base ring including a plurality of circumferentially disposed and radially directed channels configured to allow fuel to be drawn into the fuel pump assembly inlet when the base ring is disposed on a flat surface.

47. A fuel pump comprising;
a fuel pump housing having an inlet through which fuel is drawn and an outlet through which fuel is discharged under pressure;
a motor carried by the fuel pump housing;
a fuel pumping mechanism carried by the fuel pump housing and driven by the motor to draw fuel into the fuel pump through the fuel pump inlet and to discharge fuel under pressure through the fuel pump outlet, the fuel pumping mechanism including:
a pumping mechanism housing including inlet and exhaust ports that communicate with the fuel pump inlet and outlet, respectively;
an impeller rotatably supported within an impeller cavity formed in the pumping mechanism housing and rotatably driven by the motor, the impeller including axially upper and lower impeller vanes spaced around an outer circumferential periphery of the impeller;
a generally semi-circular pumping channel formed in the pumping mechanism housing around a circular periphery of the impeller cavity, the impeller vanes being configured and positioned to move fluid through the pumping channel as the impeller rotates within the impeller cavity;
a pumping channel inlet passage formed in the pumping mechanism housing and connecting the inlet port to an inlet end of the pumping channel; and
the inlet port disposed in an outer circumferential sidewall of the pumping mechanism housing.

48. A fuel pump as defined in claim 47 in which:
the semi-circular pumping channel includes upper and lower channel portions formed into respective upper and lower impeller cavity walls;
the upper and lower impeller vanes are configured and positioned to move fluid through the upper and lower channel portions, respectively;
the pumping channel inlet passage includes axially-spaced upper and lower inlet passages formed into the pumping mechanism housing and communicating with the upper and lower channel portions, respectively; and
the inlet port includes axially spaced upper and lower side inlet ports communicating with the respective upper and lower inlet passages.

49. A fuel pump as defined in claim 48 in which a generally cylindrical pumping mechanism retainer sleeve is coaxially disposed around the fuel pumping mechanism and is configured to hold pumping mechanism components together.

50. A fuel pump as defined in claim 49 in which the pumping mechanism retainer sleeve includes a side inlet window aligned with and exposing the side inlet ports.

51. A fuel pump as defined in claim 48 in which:
the fuel pumping mechanism includes a pumping channel exit passage formed in the pumping mechanism housing and connecting an outlet end of the pumping channel with the exhaust port; and
the exhaust port is formed in the circumferential sidewall of the pumping mechanism housing.

52. A fuel pump as defined in claim 48 in which the lower inlet passage crosses without intersecting the pumping channel exit passage.

53. A fuel pump as defined in claim 52 in which the upper inlet passage crosses without intersecting the pumping channel exit passage.

54. A fuel pump as defined in claim 53 in which:
the upper inlet passage crosses over the pumping channel exit passage; and
the lower inlet passage crosses under the pumping channel exit passage.

55. A fuel pump as defined in claim 51 in which the pumping channel exit passage includes an upper exit passage and a lower exit passage spaced axially from the upper exit passage.

56. A fuel pump as defined in claim 47 in which the pumping channel inlet passage merges into the pumping channel in a direction generally tangential to the pumping channel.

57. A fuel pump as defined in claim 54 in which a floor of the pumping mechanism retainer sleeve defines a floor of the lower side inlet and the lower inlet passage.

58. A fuel pump as defined in claim 54 in which an annular cover plate is disposed on an upper surface of the pumping mechanism housing to close the upper side inlet and inlet passage of the upper channel.

59. The fuel pump of claim 1 wherein the fuel passage communicates the outlet of the fuel pumping mechanism with the outlet of the housing such that the pressure within the motor chamber is less than 50% of the pressure of fuel discharged form the fuel pumping mechanism.

60. The fuel pump of claim 1 wherein the fuel passage is formed completely in a portion of the housing that defines The motor chamber and that has a continuous outer circumferential surface that surrounds the motor chamber.

* * * * *

UNITED STATES PATENT AND TRADEMARK OFFICE
CERTIFICATE OF CORRECTION

PATENT NO. : 6,231,318 B1
DATED : May 15, 2001
INVENTOR(S) : Kenneth J. Cotton et al.

It is certified that error appears in the above-identified patent and that said Letters Patent is hereby corrected as shown below:

Title page,
The title should read -- Item [54] IN-TANK FUEL PUMP RESERVOIR --

Column 1,
Line 1, please change the title from "In-Take Fuel Pump Reservoir" to -- In-Tank Fuel Pump Reservoir --.

Column 11,
Line 6, change "The" to -- the --.

Signed and Sealed this

Twenty-fifth Day of December, 2001

Attest:

Attesting Officer

JAMES E. ROGAN
Director of the United States Patent and Trademark Office